United States Patent
Gimlan et al.

(10) Patent No.: US 9,018,812 B2
(45) Date of Patent: Apr. 28, 2015

(54) TRANSPORTATION DEVICE WITH RECIPROCATING PART AND KINETIC STORAGE

(76) Inventors: Gideon Gimlan, Los Gatos, CA (US); Arye ("Arik") Donde, Cupertino, CA (US)

(*) Notice: Subject to any disclaimer, the term of this patent is extended or adjusted under 35 U.S.C. 154(b) by 548 days.

(21) Appl. No.: 13/374,913

(22) Filed: Jan. 23, 2012

(65) Prior Publication Data

US 2012/0192784 A1     Aug. 2, 2012

Related U.S. Application Data

(60) Provisional application No. 61/462,134, filed on Jan. 28, 2011.

(51) Int. Cl.

| | |
|---|---|
| *H02K 7/10* | (2006.01) |
| *H02K 7/18* | (2006.01) |
| *H02K 7/02* | (2006.01) |
| *B60K 7/00* | (2006.01) |
| *B60K 25/10* | (2006.01) |
| *B60T 1/10* | (2006.01) |
| *B60L 11/00* | (2006.01) |
| *B60L 11/16* | (2006.01) |
| *B60L 11/18* | (2006.01) |
| *B60T 13/58* | (2006.01) |
| *B62M 1/28* | (2013.01) |
| *B62M 6/40* | (2010.01) |
| *B62K 3/00* | (2006.01) |
| *B60K 1/04* | (2006.01) |

(52) U.S. Cl.
CPC ............. *H02K 7/1861* (2013.01); *H02K 7/025* (2013.01); *B60K 7/0007* (2013.01); *B60K 25/10* (2013.01); *B60T 1/10* (2013.01); *B60K 2001/0411* (2013.01); *B60K 2007/0061* (2013.01); *B60K 2025/103* (2013.01); *B60Y 2200/12* (2013.01); *B60Y 2200/126* (2013.01); *B60Y 2200/13* (2013.01); *B60Y 2400/162* (2013.01); *B60Y 2400/164* (2013.01); *B60L 11/007* (2013.01); *B60L 11/16* (2013.01); *B60L 11/18* (2013.01); *B60L 2200/22* (2013.01); *Y02E 60/16* (2013.01); *Y02T 10/7005* (2013.01); *Y02T 10/7033* (2013.01); *Y02T 10/641* (2013.01); *B60T 13/586* (2013.01); *B62M 1/28* (2013.01); *B62M 6/40* (2013.01); *B62K 3/002* (2013.01); *B62K 2204/00* (2013.01)

(58) Field of Classification Search
USPC ............ 310/15, 17, 20, 75 C, 75 B, 112–114, 310/266–268, 12.12; 180/65.1–65.5, 180/165–166
See application file for complete search history.

(56) References Cited

U.S. PATENT DOCUMENTS

| | | | | |
|---|---|---|---|---|
| 4,032,829 | A * | 6/1977 | Schenavar | 322/3 |
| 6,189,907 | B1 * | 2/2001 | Nelson et al. | 280/258 |
| 6,626,442 | B2 * | 9/2003 | Pahis | 280/11.115 |

(Continued)

*Primary Examiner* — Thanh Lam

(57) ABSTRACT

Manual drive energy is input into a transport device of one embodiment by linearly reciprocating a first drive member that couples by way of a ratchet mechanism (or other mechanical motion rectifier means) and a mechanical motion amplifier means to one or more faster spinning flywheel masses. The one or more flywheel masses are formed in part by a combination electric motor/generator and it has rechargeable electric batteries distributively provided about a flywheel mass portion thereof. Tapered roller bearings having ferromagnetic material are interposed between the one or more flywheel masses and/or between one of the flywheels and a stationary frame of the transport device so as to repeatedly make and break closed magnetic flux conducting loops and thus provide at least one of an electric motoring and electricity generating function.

20 Claims, 10 Drawing Sheets

(56) References Cited

U.S. PATENT DOCUMENTS

| | | | |
|---|---|---|---|
| 7,285,868 B2 * | 10/2007 | Wilson | 290/1 R |
| 7,466,049 B1 * | 12/2008 | Vancea | 310/75 C |
| 7,980,573 B1 * | 7/2011 | Naman | 280/87.041 |
| 2006/0131084 A1 * | 6/2006 | Rupp | 180/65.1 |
| 2007/0089919 A1 * | 4/2007 | de la Torre et al. | 180/65.2 |
| 2007/0089924 A1 * | 4/2007 | de la Torre et al. | 180/305 |

* cited by examiner

100

100'

100"

200

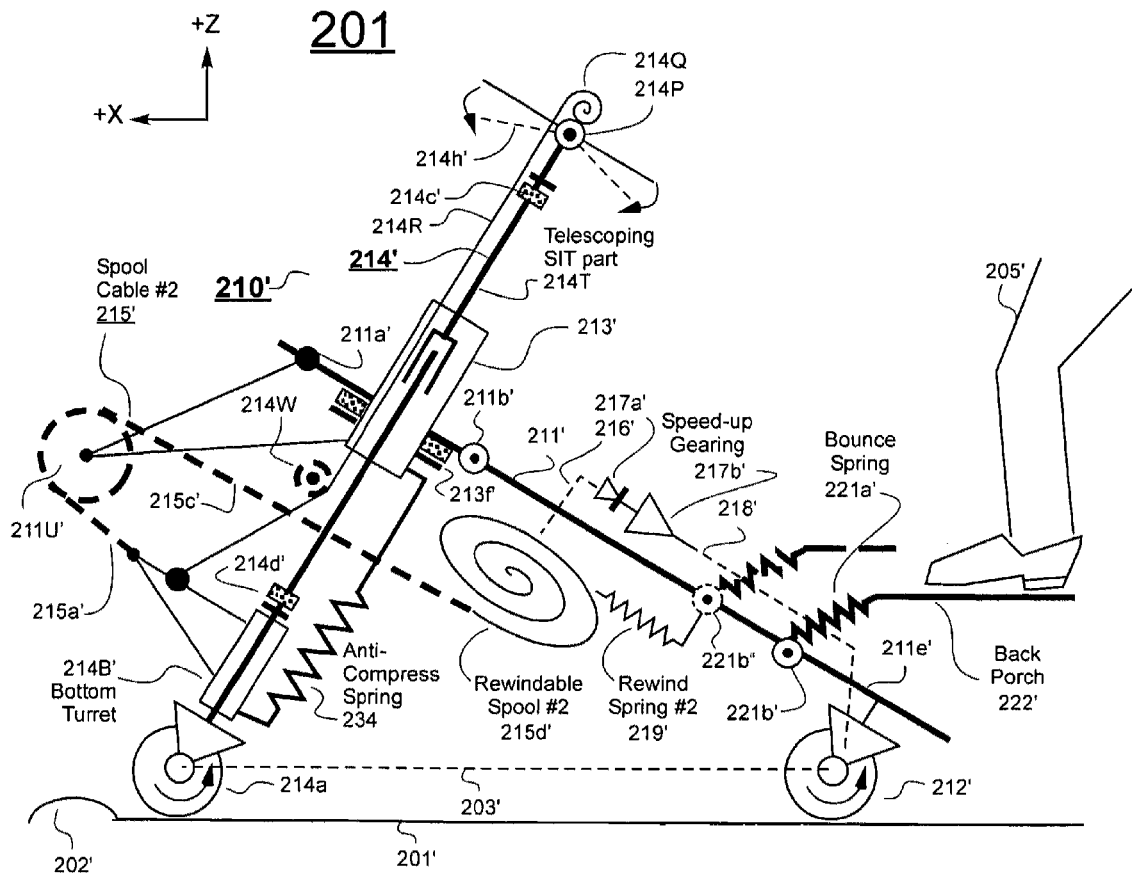

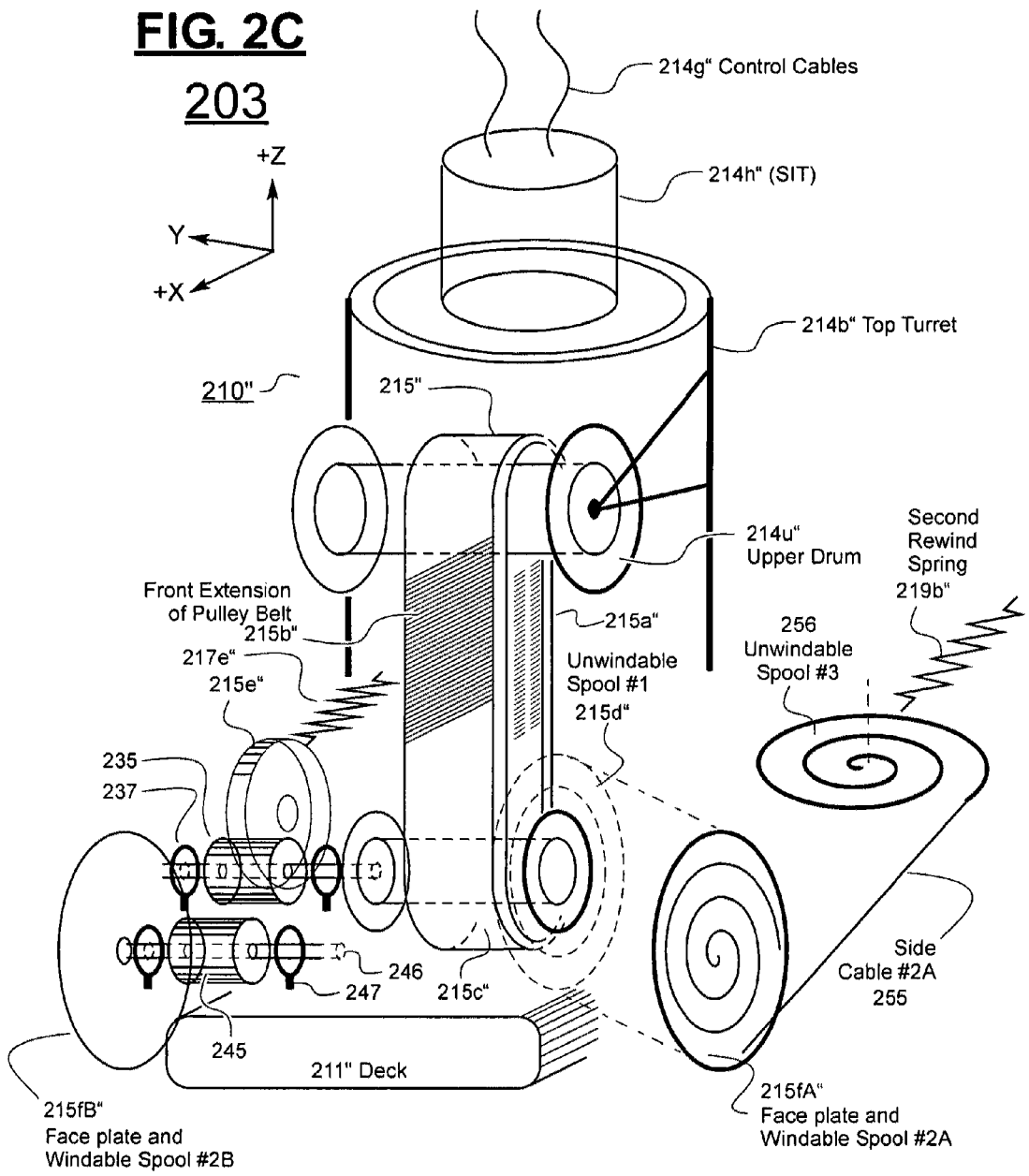

300'

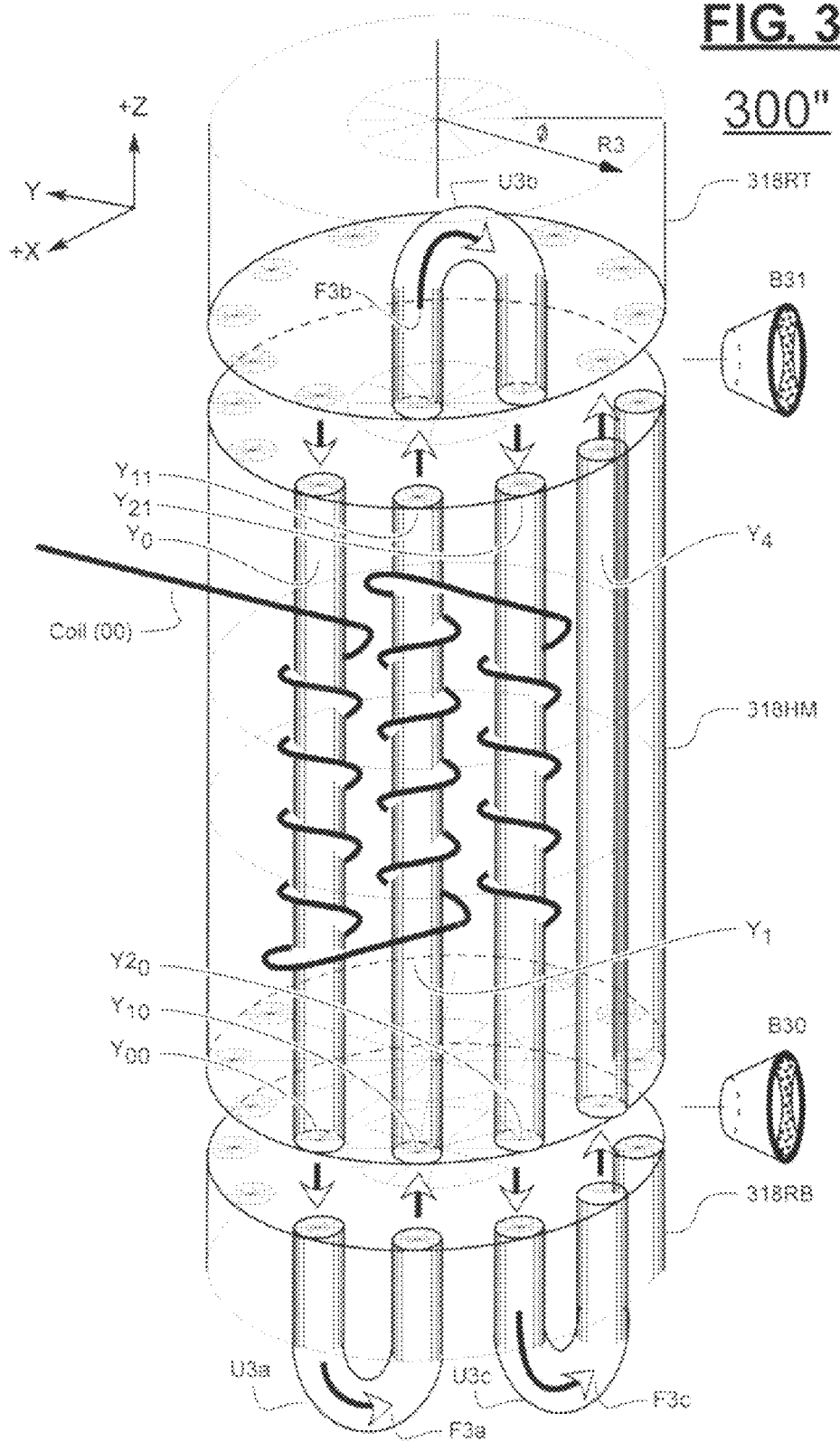

TRANSPORTATION DEVICE WITH RECIPROCATING PART AND KINETIC STORAGE

CLAIM OF BENEFIT

The present application is a continuation-in-part (CIP) of earlier filed U.S. Provisional Ser. No. 61/462,134 filed Jan. 28, 2011 (entitled "Transportation Assisting Devices") on behalf of G. Gimlan and A. Donde and incorporated herein by reference in its entirety.

FIELD OF DISCLOSURE

The present disclosure of invention relates generally to devices and methods that may be used to assist in the transport of people and their belongings. The disclosure relates more specifically to hybrid transportation devices such as those that rely on two or more energy sources (e.g., manually input kinetic energy and stored kinetic/electrical energy) for powering transportation related activities and the like. Yet more specifically, the present disclosure provides a transportation device with a reciprocating input end whose reciprocations are converted into useful and/or stored energies.

CROSS REFERENCE TO PATENTS

In addition to incorporation herein by reference of U.S. Provisional Ser. No. 61/462,134 (filed Jan. 28, 2011), the disclosures of the following U.S. patents are also incorporated herein by reference:
(A) U.S. Pat. No. 7,615,970 issued Nov. 10, 2009 to Gideon Gimlan and entitled "Energy invest and profit recovery systems";
(B) U.S. Pat. No. 6,936,994 issued Aug. 30, 2005 to Gideon Gimlan and entitled "Electrostatic energy generators and uses of same"; and
(C) U.S. Pat. No. 5,839,737 issued Nov. 24, 1998 to L. Kruczek and entitled "Self Propelled Skateboard".

DESCRIPTION OF RELATED TECHNOLOGY

As costs of fossil fuels increase, attendant noise/pollution problems grow, and populations increase, a need for alternative and personal transportation devices (a.k.a. herein, PPTA's or Pollutionless Personal Transport Apparatuses) increases. A variety of solutions have been proposed. Included in these are hybrid gasoline/electric vehicles and all electric vehicles. Manual-power-only transport devices such as conventional bicycles are an option as well.

Rather than repeating the disclosure and teachings of here incorporated U.S. Provisional Ser. No. 61/462,134, part of its content may be summarized as follows: Manual drive energy may be input into a transport device by reciprocating a first drive member (e.g., front end) of the device. That reciprocating motion may be converted (mechanically rectified) into one-way rotating motion by means of a ratchet-like mechanism. The one-way rotating motion may have its speed increased by way of speed-up gearing. The sped-up, one-way rotational motion may then be coupled to a variety of energy storing and/or energy using means such as fast spinning flywheel(s) and a driven propulsion wheel of the transport device. In one embodiment, the transport device is a two-wheel scooter. In one embodiment, the flywheel(s) of the transport device couple by way of slow-down gearing and a clutch to the driven propulsion wheel of the transport device. In one variation, one or more of the flywheels defines a combination electric motor/generator and it has a rechargeable electric batteries distributively provided within at least that one flywheel. Tapered roller bearings having ferromagnetic material are interposed between the one or more flywheels and/or between one of the flywheels and a stationary frame of the transport device so as to repeatedly make and break closed magnetic flux conducting loops and thus provide at least one of an electric motoring function and an electricity generating function. (Drawings of the here incorporated U.S. Provisional Ser. No. 61/462,134 will be uniquely referred to herein as ProvFig. P1A through ProvFig. P8B so as to distinguish them from the additional figures provided by this CIP disclosure.)

Providing one or more of such functionalities in a compact, light weight and economical arrangement can be problematic. It would be advantageous to have a low or non-fossil fuel burning transport device (e.g., a PPTA) that is capable of one or more of the following: (a) allowing for flexible and light weight conversion of reciprocating motion occurring along a first direction and in a first location on the transport device into one-way rotational motion about a desired rotational axis (e.g., vertical axis) located at a second location on the transport device, (b) allowing for recovery and regenerative storage of shock absorbing energy in addition to recovery of braking energy, (c) allowing the user to make gainful employment of time spent when waiting to cross an intersection, (d) allowing the user to publicly demonstrate proficiency in use of the transport device and/or proficiency in dancing or other exercising capabilities in synchronism with publicly available music, and (e) overcoming the problem of running out of energy mid-trip because of depleted electric batteries or alike depleted energy storage devices.

It is to be understood that this description of the related technology section is intended to provide useful background for understanding of here disclosed technology and as such, this related technology description section may include ideas, concepts or recognitions that were not part of what was publicly known or appreciated by those skilled in the pertinent art prior to corresponding invention dates of subject matter disclosed herein and/or in the here incorporated U.S. Provisional Ser. No. 61/462,134.

SUMMARY

An energy converting and storing apparatus in accordance with the present disclosure of invention and which is usable for assisting in transport may comprise one or more of the following: (a) a vehicle deck; (b) a steering column reciprocatably disposed on or through the deck and providing a steering function for a steerable bottom wheel of the device as well as reciprocating function relative to the deck; (c) a flexible rope, cable (e.g., slippery wire rope), a relatively flat belt (e.g., one having a W-shaped, self centering cross sectional profile) or other flexible tensile means operatively coupled between the reciprocatable steering column and a first spooling wheel that is rotatably mounted to the deck, whereby a reciprocating action of the steering column may be flexibly coupled to the first spooling wheel by way of corresponding displacement (reciprocation) of the flexible tensile means; (d) a rewind spring mechanism coupled to the first spooling wheel for keeping the flexible tensile means taut and for rewinding the first spooling wheel after the latter has been partially or fully unwound by a tensioned pulling of the flexible rope, cable or other flexible tensile means; (e) a ratchet action or other type of converting mechanism (e.g., full wave mechanical diode) which converts rotational reciprocations of the first spooling wheel into one-rotations of a second wheel; (f) a speed increasing means operatively coupled to at least one of the first spooling wheel and second wheel and structured for increasing the respective speed of reciprocation or one-way rotation of the first spooling wheel or of the second wheel respectively; and (g) an energy using or energy accumulating and storing mechanism operatively coupled to receive power output by the speed increasing means, where in one embodiment, that power is stored as at least one, but preferably more of a flywheel-stored kinetic energy, lifted weight potential energy, spring stored potential energy, a stored in magnetic-field energy, an electrostatic energy and an electrochemical energy.

In one embodiment, a transport device in accordance with the present disclosure comprises one or more of the following: (a) an elongated main deck having a rear portion disposed to pivot about a rear ground-engaging wheel of the transport device and having a steering-column guiding sleeve disposed near a front portion of the main deck; (b) a reciprocatable steering-column extending reciprocatably through the steering-column guiding sleeve; (c) a wire rope cable and/or other flexible pulley means having first and second ends where a first end segment of the flexible pulley means is coupled to at least one of the reciprocatable steering-column and the front portion of the main deck; (d) a first spooling wheel receiving a second end segment of the wire rope cable or other flexible pulley means and rotatably mounted to the main deck, the first spooling wheel being able to rotatably reciprocate; (e) a rewind spring mechanism coupled to rewind the first spooling wheel after the latter has been at least partially unwound by a reciprocation of the steering-column and a corresponding pulling by the flexible pulley means; (f) a reciprocation rectifying means (e.g., two ratchets or sprag clutches) coupled to the rotatably reciprocatable first spooling wheel for producing one-way rotation therefrom; (g) rotation speed-up means coupled to the reciprocation rectifying means (mechanical diodes) for increasing rotational speed of the produced one-way rotation; (h) energy storing means for storing energy of the sped-up one-way rotation; and (i) output coupling means for coupling the stored energy to the rear ground-engaging wheel of the transport device.

The energy storing means may be, but does not have to be, in the form of the primary electric generator/motor forming means disclosed in here incorporated U.S. Provisional Ser. No. 61/462,134 which is integrally formed as part of one or more of the flywheels and which cooperates with ferromagnetic-containing rollers (e.g., magnetic-path forming/breaking rollers) that are operatively interposed between the counter-rotating flywheels, or are interposed between a flywheel and its surrounding frame, where the relative-rotating motion between the flywheels in combination with relative motion of the interposed ferromagnetic rollers acts to repeatedly make and break one or more magnetic flux conducting loops (e.g., serpentine flux loops).

In one embodiment, the energy storing means is in the form of a fixed support shaft around which a planetary-gears containing first cylindrical housing rotates. A speed increasing output gear of the planetary-gears system drives a centrally-hollowed tube shaft of an electric generator in a direction opposite to the rotation direction of the first cylindrical housing. The centrally-hollowed tube shaft rotates about the fixed support shaft while an outer cylindrical body of the electric generator attaches to and rotates with the first cylindrical housing that contains the planetary speed-up gears. A first set of rechargeable batteries are attached to and symmetrically distributed about the outer diameter of the combination of electric generator and gears housing (first cylindrical housing), where that first set of rechargeable batteries electrically connects to the generator. In this way the combined mass of the planetary speed-up gears (and their housing) and of the outer cylinder body of the electric generator and of the first rechargeable batteries serves as a first flywheel mass rotating at relatively low RPM for storing kinetic energy therein. At the same time the oppositely spinning generator rotor serves as a second flywheel rotating mass at a much higher RPM for storing kinetic energy therein. Commutation is provided between the low RPM outer body and the vehicle frame so that electric power can be fed out of and/or into (e.g., as regenerative braking power) the first set of rechargeable batteries. Preferably the hollow tube shafted electric generator can also function as a motor that is driven by electrical power from regenerative braking so that regenerative energy is first stored as kinetic flywheel energy and then used to slowly trickle charge into the onboard first set of rechargeable batteries. A second set of rechargeable batteries may be affixed to the vehicle frame.

Other aspects of the disclosure will become apparent from the below more detailed description.

BRIEF DESCRIPTION OF THE DRAWINGS

The below detailed description section makes reference to the accompanying drawings, in which:

FIG. 2B is a schematic side view diagram of a second transport vehicle with a different arrangement of parts;

FIG. 2C is a perspective schematic view diagram of a pulley belt system;

FIG. 3C is a schematic perspective view of a serpentine-flux using generator portion of a motor/generator embodiment in accordance with the present disclosure;

DETAILED DESCRIPTION

Figure 1A:
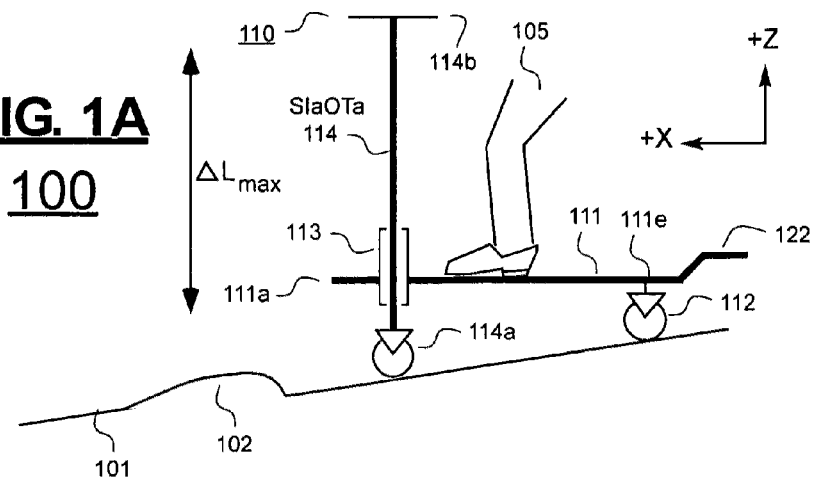
FIG. 1A is a schematic side view diagram of a first transport vehicle structured in accordance with the disclosure and shown in a downhill coasting mode that may encounter bumps.

Referring to FIG. 1A, shown here is a schematic diagram of an urban transport infrastructure environment 100 within which the here disclosed devices and methods may be employed. The illustrated environment 100 includes a downwardly inclined roadway 101 having bumps 102 and/or ruts over which a forward moving transport device 110 may roll as it coasts downhill with a rider 105 standing on a main deck 111 of the device 110. The horizontally flat and forward direction will generally be designated herein as +X and the vertically upward direction relative to gravity as +Z.

As a steerable front wheel 114*a* of the device 110 encounters an upward protruding bump 102 in the roadway 101, some of the forward momentum of the user 105 and vehicle mass is consumed in bringing the front wheel 114*a* up and over the bump 102. In a conventional vehicle, such encounters with roadway bumps 102 and/or ruts (not shown) may result in loss of vehicle forward momentum (even if not perceived by the user) and thus wastage of energy produced or previously stored (e.g., as E=mgh potential energy) for keeping the vehicle moving in the forward direction. Since few roadways are perfectly flat, repeated encounters with bumps and/or ruts can rob a vehicle of significant amounts of energy over time.

However, in accordance with one aspect of the present disclosure, the illustrated vehicle 110 has a reciprocatable front steering-column 114 reciprocatably extending through a reciprocation guiding sleeve 113 attached to the main deck 111. A jousting encounter of the front wheel 114*a* with the bump 102 is converted into a reciprocation of the front steering-column 114 through the guiding sleeve 113 and relative to the deck 111 so that at least part of that reciprocation is converted into vehicle stored energy that may later be tapped for propelling the vehicle 110 and/or doing other useful work. In one embodiment, the reciprocatable front steering-column 114 is referred to as a Steering Inner and Outer Tube assembly (SI&OTa) because it includes a cylindrical Steering Inner Tube (SIT) which is rotatable within an optionally non-cylindrical Steering Outer Tube (SOT) where the SOT is reciprocatably received in a non-cylindrical (and/or keyed) guiding sleeve (e.g., 113 but see instead and briefly FIG. 4A as an example). This however is not the only way to form a reciprocatable front steering-column 114. Another method will be described later in conjunction with FIG. 2A.

Still referring to FIG. 1A, a steering handle bar 114*b* may be provided near a top end of the steering-column 114 and in opposition to the steerable front wheel 114*a* at the bottom end. The steering-column 114 may reciprocate within the guiding sleeve 113 by a maximum displacement distance of $\Delta L_{max}$ although smaller displacement lengths $\Delta L_{small}$ are more typical. It is up to the user to decide how far within the $\Delta L_{max}$ limit range the deck front end 111*a* and sleeve 113 will ride up and down along the available reciprocation length ($\Delta L_{max}$) of the steering-column 114. A point, 111*e* near the rear of the main deck 111 is located above the rear ground-engaging wheel 112 of the device. It defines a pivot point, relative to which the user (105) may place most of his weight on a back-porch 122 behind the pivot point 111*e* for thereby urging the front 111*a* of the deck to rise up along the steering-column 114 as the main deck 111 rotates (counter-clockwise (ccw) in FIG. 1A) about the pivot point 111*e* if desired. Conversely, the user (105) may place most of his weight on a point along the main deck that is forward of the pivot point 111*e* and this will urge the front 111*a* of the deck to descend down along the steering-column 114 as the main deck 111 rotates (clockwise (cw) in FIG. 1A) about the pivot point 111*e*. In one embodiment, the reciprocation guiding sleeve 113 is fixed to be substantially perpendicular of the main deck 111 although other angles, for example in the range of about +60 to −60 degrees relative to the major plane of the main deck may be used. In an alternate embodiment, the reciprocation guiding sleeve 113 is allowed to swivel in a range for example of about +60 to −60 degrees relative to the major plane of the main deck so as to thereby switch the steerable front wheel 114*a* between a caster mode of engagement with the upcoming roadway and a jousting mode of engagement. For the case where the reciprocation guiding sleeve 113 is fixed to keep the steering-column 114 perpendicular with the main deck 111, different variations of a hypothetical right triangle (see FIG. 1C) are defined as the portion of the steering-column 114 below the deck lengthens or shortens.

It is to be noted that, in this embodiment, the main deck 111 does not pivot atop yet another deck or frame-forming part of the transport device 110 as is the case for example in the "Self Propelled Skateboard" of Kruczek U.S. Pat. No. 5,839,737 (cited above), but instead uses the roadway 101 as the support for its pivot point 111*e* and uses the rear vehicle wheel 112 as its pivot enabling means. This arrangement helps to reduce the weight and complexity of the transport device 110 as compared to other designs (e.g., Kruczek U.S. Pat. No. 5,839,737) where a user-rocked deck pivots atop another frame-forming part (e.g., second deck) of the transport device. On the other hand, the reciprocating steering-column arrangement introduces the problem of keeping the steering-column 114 freely reciprocatable within the reciprocation guiding sleeve 113. The latter problem may be solved with use of low friction materials, lubricants, roller bearings and/or other reciprocation easing means.

Still referring to FIG. 1A, a further point to be noted is that in one embodiment, the user may lock the reciprocation range of the steering-column 114 to a predetermined subrange of the maximum displacement range, $\Delta L_{max}$ whereby the rider may then, for example, keep the main deck 111 relatively horizontal even while coasting down a relatively steeply inclined roadway 101. It is within the contemplation of the disclosure to provide for conventional and/or energy regenerative braking when the transport device 110 is traveling down an incline. And as will become apparent below, the bump (102) energy regenerating portion of the mechanism can provide a shock absorbing function as well as recapturing some of the bump engagement energy for future performance of useful work.

Figure 1B:
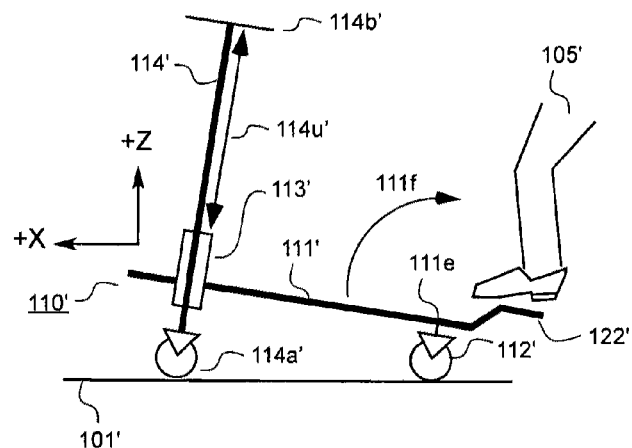
FIG. 1B is a schematic side view diagram of the transport vehicle of FIG. 1A and shown in a back-porch riding mode.

Referring next to FIG. 1B, shown here is a mode 100' where the roadway 101' is relatively horizontal and the rider 105' has placed at least a major portion of his weight on the back-porch 122' of the device so as to thus urge the main deck 111' to pivot clockwise (cw) 111*f* about the illustrated pivot location 111*e*. The front wheel 114*a* will generally remain engaged with the roadway 101' in this case for at least one of several reasons. First, the weight of the steering-column assembly may be sufficient to overcome what little frictional force there is in the sleeve 113 so as to keep the front ground wheel 114*a* engaged with the roadway 101'. Second, in some embodiments, a persistent triangle-maximizing force will be present, for example in the form of a spring-maintained force, for maximizing the area of a hypothetical triangle having its three corner points substantially defined by: the pivot point 111*e*, the sleeve 113' and the front wheel 114'. This hypothetical triangle-maximizing force may alternatively be referred to as an upper-steering-column length-shortening force which seeks to reduce the distance 114*u'* shown in FIG. 1B between the sleeve 113' and the steering handle bar 114*b'*. More specifically but briefly at this stage, in the exemplary embodiment 210 of FIG. 2A such an upper-steering-column length shortening-force may be provided by spool rewinding spring 219. The amount of force that the rider 105' will usually need to apply down against the back-porch 122' for effecting the clockwise (cw) pivoting 111*f* will tend to be relatively small due to the assistance provided by the triangle-maximizing force of the rewind spring means. Also, if the rear wheel 112' of the transport device is being then torqued counter-clockwise (ccw), by an on-board torquing means (e.g., a propulsion motor, not yet shown), the on-board torquing means will be applying a counter-torquing force to the main deck 111' so as to urge the main deck 111' to pivot clockwise (cw) 111f about the illustrated pivot point 111e. As a result, the length of the back-porch 122' (or its extension rearward of the pivot point 111e) can be kept relatively small while allowing the rider to easily effect a clockwise (cw) pivoting action 111f. In one embodiment, a control lever (not shown) may be provided on the handle bars 114b' for limiting the extent of the clockwise (cw) pivoting action 111f. Such hand-actuated control over the maximum angular sweep of a clockwise (cw) pivoting action 111f may be desirable because, as will be appreciated from next-discussed FIG. 1C, the clockwise (cw) pivoting action 111f is defining the upward incline angle of a hill (so to speak) that the user 105' creates for himself to next climb up along in FIG. 1C for manually pumping energy into the system. By respectively decreasing or increasing the angular sweep of the clockwise (cw) deck pivoting action 111f, the user can select for himself the amount of effort that will be needed to next climb to the top of the deck-formed hill if the user so chooses to climb that far. Stated otherwise, the user 105' determines in this phase of operating the transport device 110 what amount of E=mgh hill-climbing energy he can next input into the system 110 in his next forward step up along or leap forward onto the upwardly inclined main deck 111" shown in FIG. 1C.

Figure 1C:
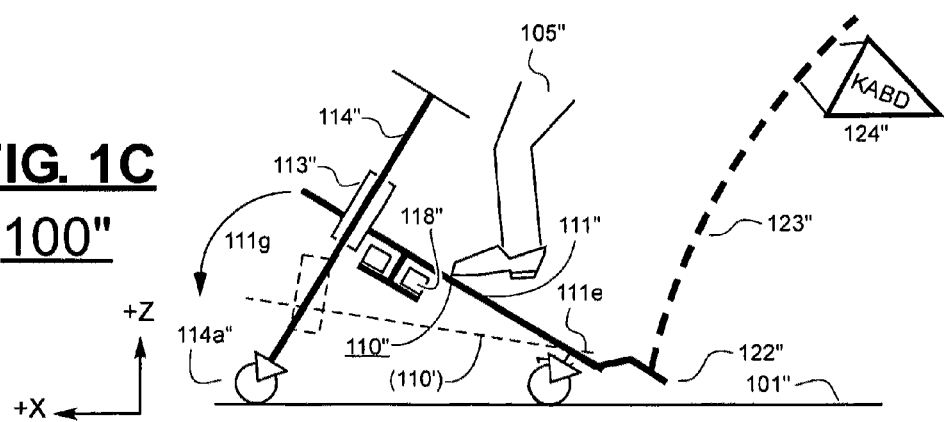
FIG. 1C is a schematic side view diagram of the transport vehicle of FIG. 1A and shown in a steering-column up-thrusting mode (up-thrusting relative to the deck and through the reciprocation guide sleeve)

Referring to the stamping-down mode 100' shown in FIG. 1C, here the roadway 101" is again relatively horizontal but now the rider 105" has shifted at least a major portion of his weight off the back-porch 122" and onto a selected forward point along the length of the upwardly inclined main deck 111", where that selected point is forward of the illustrated pivot point 111e. This has the effect of urging the main deck 111 to pivot counter-clockwise (ccw) 111g about the illustrated pivot point 111e. The front ground wheel 114a" will generally remain engaged with the roadway 101" in this case for at least one of several reasons. First and again, the weight of the steering-column assembly may be sufficient to overcome what little frictional force there is in the on-deck sleeve 113" so as to keep the front wheel 114a" engaged with the roadway 101". Second, the counter-clockwise (ccw) pivoting action 111g drives the front wheel 114a" toward continued engagement with the roadway 101". Third, in some embodiments, a persistent triangle-maximizing force will be present due to a rewind spring or other forces (e.g., a rewind motor, not shown) that also urge the front wheel downwardly.

By selecting a forward point along the length of the main deck 111" where his weight will be mostly applied, the rider 105" inherently selects a leverage factor that determines how much force or acceleration his forward step (it could be a forward jump and stamp-down action) will ultimately exert on the point where the sleeve 113" meets with the steering-column 114". The closer that the user applies his forward step (or jump) to where the sleeve 113" meets with the deck 111", the greater will be that ultimately exerted force and conversely, the closer that the user applies his forward step (or jump) to where the pivot point 111e is located, the smaller will be that ultimately exerted force and corresponding to input power. Stated otherwise, the user 105" can game the energy inputting side of the system (110) and the format of power applied thereto by determining with each backward weight shift onto the back-porch 122 and with each forward weight shift onto the main deck 111" how much energy he wants to input as a next power input impulse into the system and how fast he wants to do so. In one embodiment, a pancake style electric generator 118" (e.g., one having a centrally-hollowed rotor shaft) is hung by its shaft from the underbelly of the deck and the outer-body (what is normally referred to as the stator) is rotated by a mechanical drive (not yet shown) obtained from the displacement of the steering-column 114" relative to the sleeve 113". The outer-body (normally referred to as the stator) of the pancake style electric generator 118" thereby serves as a first flywheel mass for partly storing kinetic energy (another part of which is stored in a faster counter-rotating rotor mass), which energy is ultimately converted to electricity and stored and/or used elsewhere in the vehicle. In one embodiment, the electric generator 118" is of an excited fields type in which the magnetic field strength is variable in response to electronic control rather than being mostly (or at all) permanent and thus the counterforce that the electric generator 118" feeds back to the mechanical drive (not yet shown) and ultimately to the vehicle pumping efforts of the rider 105" are tunable over time (e.g., electronically) so that the counterforce is varied over time to match user desires and/or changing environmental and/or vehicle conditions. A control knob (not shown) may be provided on the handle bars for allowing the user to select among various counterforce variation options. Additionally or alternatively, an on-board computer can perform the selecting.

In one embodiment, the user may demonstrate to others around him that he is listening to identifiable music (e.g., by displaying a corresponding radio station flag 124" having the radio station identification, i.e., hypothetical call letters "KABD") and the user may "dance" (so to speak) on the vehicle deck 111 in synchronization to the station's current music while at the same time gaming the deck so as to realize a desired format of power input (e.g., force versus displacement distance versus repetition rate) into an energy receiving and storing subsystem (e.g., 118" not yet fully shown) of the transport device 110. In one embodiment, the music source identifying flag 124" is attached to a flexible back pole 123" of the vehicle 110" where the combination of the flexible back pole 123" and flag 124" also serves as a safety mechanism for alerting automobile drivers that a manually powered vehicle is sharing the roadway 101" with them. A flag reciprocating mechanism may be included as part of the flexible back pole apparatus 123" for actively causing the identifying flag 124" to reciprocate up and down and thus draw greater attention to the rider and his vehicle use activities. The flag may have light reflecting portions.

Figure 2A:
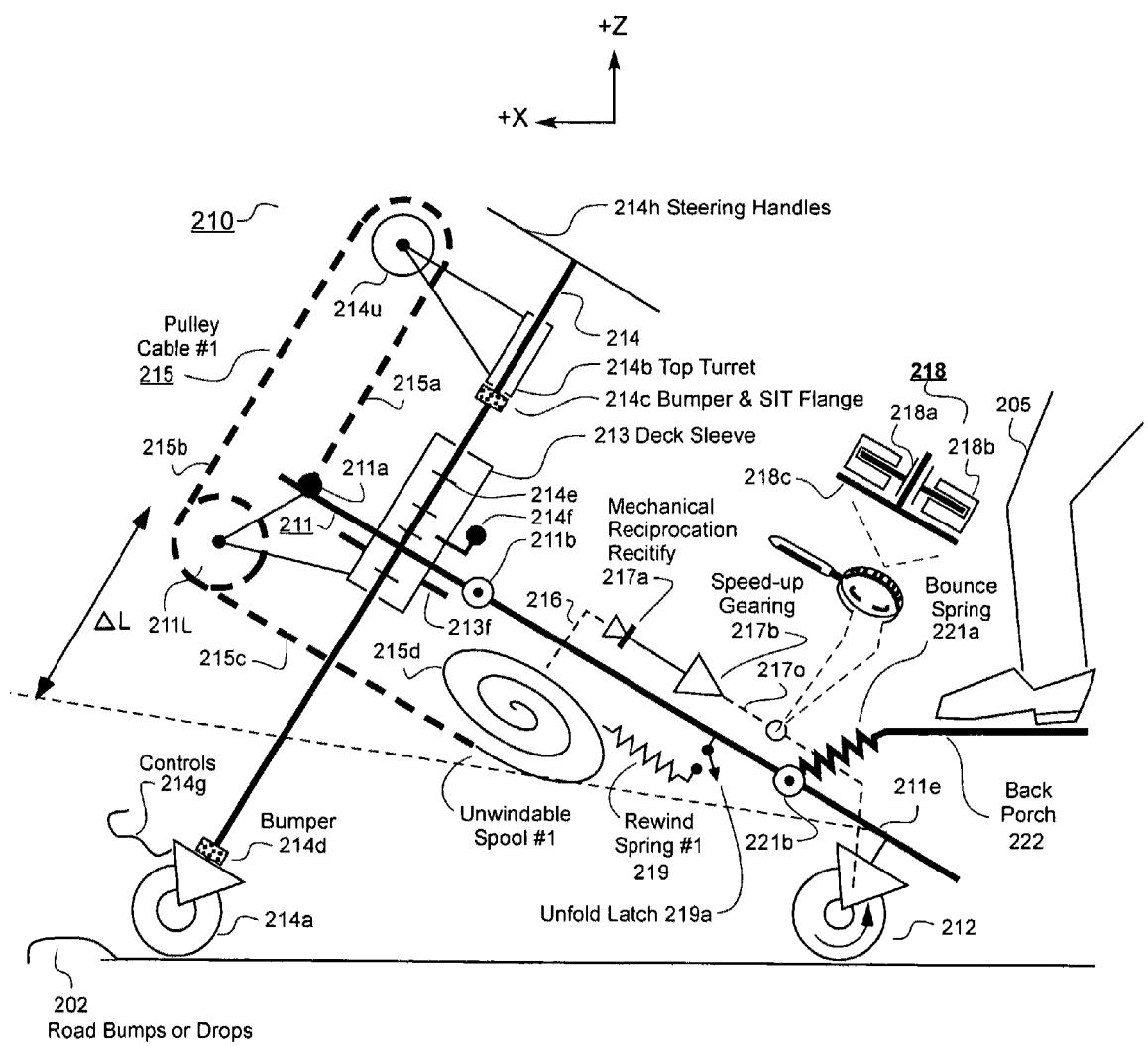
FIG. 2A is a schematic side view diagram of a second transport vehicle structured in accordance with the disclosure and having a pulley structured front end as well as a spring cantilevered back-porch.

Referring now to a more specific embodiment 210 shown in environment 200 of FIG. 2A, here the coupling of reciprocation power from the reciprocatable steering-column 214 (when reciprocating) to an energy receiving and storing and/or energy using means (e.g., 218—see magnification) on the deck 211 is provided by a flexible tensile means such as a pulley-connected, wire rope cable 215 (or alternatively, a pulley-connected flat belt as will be described below). It is to be understood that, where practical, like reference symbols and numbers in the "200" century series are used for elements of FIG. 2A which correspond to, but are not necessarily the same as the elements represented by similar symbols and reference numbers of the "100" century series in FIGS. 1A-1C. As such, a repeated introductory description of some elements found in FIG. 2A is omitted here. The more notable features of embodiment 210 include: a normally-wound first spool wheel 215d, a cable 215 (or other flexible tensing means) configured to repeatedly unwind the spool, a spring 219 (or other urging means) configured to repeatedly rewind the spool, a half or preferably, full wave mechanical rectification means 217a that converts rotational reciprocation of the first spool 215d into a one-way rotational power format, a further power format converting means 217b (e.g., speed-up gears) that converts a large-force/slow speed power format input thereto into a faster-speed/lower force power format, and at least one of an energy receiving and storing means (e.g., generator plus batteries pack 218—see FIG. 3A) and an energy using means (e.g., driven rear ground-engaging wheel 212, which wheel mechanism can include a secondary motor/generator—not yet shown, see 360 of FIG. 3A).

Before moving into a more detailed discussion of FIG. 2A, it is to be noted that conversion of human manual power (e.g., provided by leg muscles in user body section 205) into stored electrical energy (e.g., produced by generator 218 and stored by rechargeable batteries—not yet shown) and then conversion of the latter back into mechanical power is less efficient than coupling of human manual power directly through an all mechanical means (e.g., the gears and chains of a conventional bicycle) to a driven propulsion wheel (like 212). On the other hand, and as detailed in the here-incorporated herein by reference, U.S. Provisional Ser. No. 61/462,134, the inability of purely-mechanical, conventional bicycles and the like to accumulate and to store energy when at a standstill often entices users to engage in risky behavior when crossing a traffic intersection; such as trying to breeze through as the light is turning red. This is dangerous if a cross-traveling car tries to jump the light before it turns green for cross traffic. Also, a conventional bicycle does not produce and store electrical energy for recharging cellphones, smartphones, tablet computers and the like. On the other hand, generator 218 with its on-board batteries can. Also, conventional electrical or electrical-assist bicycles are not known to include flywheels which spin during vehicle standstill for trickle charging their batteries during vehicle standstill. Also, conventional electrical or electrical-assist bicycles are not known to include means for converting shock absorber energy into stored electrical or flywheel energy. Some of these features and capabilities of the embodiment 210 shown in FIG. 2A will now be described in greater detail.

As shall become apparent from study of FIG. 2A, the rewind spring 219 normally urges cable 215 to wind up a normally pre-wound and unwindable spool wheel 215d and in so doing, the spring 219 urges the steering-column 214 into its triangle-maximizing mode (see above discussion re FIGS. 1B-1C and normally-urged deck action 111f). As a result, the main deck 211 is upwardly pulled in a deck suspending fashion towards, and from atop, the top of the reciprocatable steering-column 214 and thus towards the maximized-underbelly-triangle mode which is depicted in FIG. 1C and also in FIG. 2A. When a road bump (e.g., 202) strikes against the forward moving front wheel 214a (where usually, people would view the incident in an opposite way, namely, the forward moving front wheel 214a as striking the upward protruding bump), two things happen. Energy from the bump strike (also sometimes referred to as a shock absorber jousting action) is absorbed by the deck suspension system (214u, 215, etc.) and secondly, some of that absorbed joust energy is transferred into a displacement of spool 215d and/or spring 219. Then the transferred joust energy is coupled into energy receiving and storing means 218 (e.g., generator plus batteries pack) for conversion into stored kinetic and/or electrical energy and subsequent redeployment of that stored energy for doing useful work.

A similar form of absorption, conversion and capture occurs for drop-into-a-pothole energy when the front wheel 214a drops into a sharp roadway depression (e.g., pothole, or over the edge of a sidewalk curb) while the deck 211 is suspended in a position below its highest level relative to the steering-column 214. The sudden drop-down motion of the front wheel 214a reduces tension in cable 215 and the latter change in tensioning force is absorbed by the rewind spring 219 which then urges spool 215d to rewind by a corresponding rotational amount. If the drop down (e.g., caused by the front wheel dropping down over a steep sidewalk curb) is relatively large, the suspension based, shock absorber system (214u, 215, etc.) may oscillate for a period of time after the sharp drop occurs and this oscillating action can also be converted into reusable energy. While flexible tensile means 215 is depicted as a single cable for sake of simplicity in FIG. 2A, it is to be understood that flexible tensile means 215 can be implemented in many other forms including, but not limited to, plural cables, a spoollable flat belt (or a belt with a stackable/spoollable W-shaped cross sectional profile), a combination of belt and wire rope cables and so on.

In the illustrated example 210 of FIG. 2A, a first segment 215a of cable 215 has an end fastened to the front of the deck at a front tie point 211a. The cable 215 loops about rotatable wheel or drum 214u by about 180 degrees and has a second segment 215b that continues from upper pulley wheel (or drum) 214u to a lower wheel (or drum) 211L that is rotatably mounted on the deck 211. The cable 215 then loops under lower wheel 211L by about 90 degrees to continue as a third segment 215c which wraps into spooling wheel 215d. The spooling wheel 215d rotatably mounts about a vertical shaft (not shown) extending from the underbelly of the deck 211. The spooling wheel 215d operatively couples to a rewind spring 219 and also by way of connection 216 to a rotational reciprocation rectifying means 217a (e.g., a pair of counter turning ratcheted drums). The rectifying means 217a converts the two-way rotational reciprocation of the spooling wheel 215d into one-way rotation. A reason for converting into a one-way rotational power format is so that the power can be conveniently passed to and stored in a flywheel means. The one-way rotational power output by rectifying means 217a is next input into a rotation speed-up means such as a rotation speeding up gear train 217b. The rotation speed-up means 217b converts its received, larger-force/slower speed input power into a yet faster-speed/lower-force mechanical power output 217o. That higher speed power form 217o is then applied to at least one of an energy receiving and storing means (e.g., generator plus batteries pack 218) and an energy using means (e.g., driven rear wheel 212, which wheel mechanism can include a secondary motor/generator—not yet shown and/or a rotation speed reduction means—also not shown).

In one embodiment, the energy receiving and storing means 218 includes an electrical generator whose outer body 218b (which body may include electromagnetic coils, ferromagnetic yoke pieces, and control electronics) rotates in one direction and whose inner rotor 218a rotates at a faster speed in an opposed second direction (e.g., counter-clockwise as opposed to clockwise). The inner rotor 218a includes a centrally hollowed shaft which mounts about and rotates around a fixed suspension shaft 218c that protrudes perpendicularly from the underbelly of the deck 211. In one embodiment, the faster spinning rotor includes one or a plurality of rims that are held together against centripetal tearing-apart forces by composite fiber sheets. Electrical energy output from the generator (218) is coupled by way of power conditioning circuits to the rear propulsion wheel 212 of the vehicle 210. The power conditioning circuits may control the speed at which a secondary motor/generator (not shown, see briefly FIG. 3A) drives the rear propulsion wheel 212 of the vehicle. The power conditioning circuits (not shown) may also mediate the return of regenerative braking energy from the rear wheel's secondary motor/generator to rechargeable batteries and/or flywheels and/or spring and weight lifting means of the system. (See also FIG. 4B.) In one embodiment, the energy receiving and storing means 218 includes an electrically adjustable counterforce setting means (e.g., field coils in the electrical generator) whereby the countering force that the means 218 exerts on the power output 217o received from the rotation speed-up means 217b is variable electronically and, as a result, the force needed to unwind spool 215d and thereby drive rotation speed-up means 217b may be increased as the electrically adjustable counterforce is increased, and decreased as the electrically adjustable counterforce is decreased. One or both of the user 205 and an on-board computer (not shown) may adjust the electrically adjustable counterforce so as to obtain desired counterforce versus time and/or versus deck displacement profiles.

Since the cable 215 is in a mechanical pulley configuration by looping around drum 214u, each ΔL displacement of the reciprocatable steering-column 214 relative to the deck 211 translates into a cable displacement that is twice as long. In other words, each time the deck 211 is forced down by a distance ΔL along the steering-column length, twice as much length of cable 215 is unspooled from spool 215d and thus a first transformation of power form occurs, whereby power format is transformed into reduced force and increased speed form by the pulley style wrapping of cable 215 about upper drum 214u. In one embodiment, the maximum reciprocation displacement distance $\Delta L_{max}$ of the steering-column 214 through the sleeve 213 is in the range of about 6 inches to about 18 inches and cable 215 therefore has a length in the range of at least about 12 inches to about 36 inches respectively (at least twice as long).

The upper drum 214u is supported by a rotatable top turret 214b that rotatably mounts on the steering-column 214 as shown. A steering-column flange (not seen) is disposed under the rotatable top turret 214b and a top bumper pad 214c is attached to the bottom of the flange. Bearings may be provided atop the flange for allowing the top turret 214b to more easily turn. In extreme cases where the top of deck sleeve 213 strikes bumper pad 214c, the bumper pad absorbs that impact. Another bumper pad 214d is provided at the bottom of the steering-column for absorbing impact in extreme cases where the bottom of deck sleeve 213 strikes the lower bumper pad 214d. Other elastic means (e.g., springs) may be used in addition to or in place of the rubber like bumper pads. The deck sleeve 213 has a flange 213f provided under the deck 211. In one embodiment, the sleeve 213 and its flange 213f are made of a lightweight strong metal such as an aluminum alloy while the deck is made of a wood or plastic and may have a honeycomb internal structure for lightness of weight. Since the top turret 214b is free to revolve about the steering-column 214 (and in some cases it also is free to lift up above the pad/flange combination 214c when pulled up by an applied force—see handle bars of FIG. 2B), when the rider 205 turns the steering-column 214 by means of the handles bar, the top cable guiding drum 214u (which mounts on top turret 214b) can remain centered relative to the front center of the deck 211. One reason why the top cable guiding drum 214u is urged to remaining centered is because rewind spring 219 is working to minimize the lengths of cable segments 215a and 215b (as well as 215c). In one embodiment, lower drum 211L (mounted to the center front of the deck 211) includes a cable centering feature (e.g., a U or V-shaped cross sectional profile that receives the cable) and so does the upper drum 214u, where the cable centering feature (e.g., a U or V-shaped rim cross sectional profile in the case where the cable 215 has a circular cross sectional profile) also works to keep the top turret 214b aimed toward the front center of the deck even as the user steers one way or the other with the handles bar.

In one embodiment, the cable has a low friction (e.g., lubricated and/or slippery) outer surface so that it by itself can easily slip around the upper and lower cable guiding drums, 214u, 211L even if those drums do not rotate. As seen, the upper cable guiding drum 214u provides a U-shaped rerouting of the cable 215 about a member tied to the reciprocatable steering-column while the lower guiding drum 211L provides an L-shaped rerouting of the cable 215 about a member tied to the deck and/or its sleeve 213 so that the cable flexes from having an approximately vertical disposition for its second segment 215b relative to the deck to having a parallel extension under the deck for its second segment 215c. (In a variation, cable guiding means, 214u and 211L can be respectively replaced by U-shaped and L-shaped tube means that have low friction interior surfaces where the cable engages with and slips past such low friction interior surfaces while being routed by them.) The final segment 215d of the cable 215 wraps around the spool wheel (identified by the same reference number, 215d) and ties at its end to the hub of the spool 215d. As a result of this spool-based transfer system, the energy transferred from the reciprocating steering-column to the first spool 215d in this embodiment is not dependent on transferring a power-conveying force from an outer sheath surface of a cable (or belt) to a torqued wheel but rather it is due to a tensile force being transferred by way of a tension-maintaining center region of fibers (not shown) within the cable 215 where that tensioning is continuous from a first end 215a/211a of the cable to substantially an opposed second end portion 215d. As a result, an outer sheath layer of the cable may be made relatively slippery (e.g., lubricated with a wax or oil) along the entire length of the cable 215. In one embodiment, as mentioned, the upper cable guiding drum 214u is replaced with a U-shaped tube that has a low friction and/or slippery interior (e.g., lubricated with a wax or oil) through its interior and the upper cable guiding drum 214L is replaced with an L-shaped tube that has a low friction and/or slippery interior (e.g., lubricated with a wax or oil) through its interior.

In one embodiment, the main deck 211 has a hinged area 211b at which the deck can be folded when an anti-folding lock (not shown) is undone. The optional folding of the deck at fold line (e.g., hinge) 211b allows for compacting of the transport device 210 when not in use (e.g., stored in a locker space). Cable segment 215c extends under the deck fold line (e.g., hinge) 211b and flexes when a fold is actuated. The spool 215d is mounted rearward of the deck fold line 211b. For good compacting to occur, the sleeve 213 should be slid down to the bottom of its reciprocation limit along the steering-column 214 when the transport device 210 is folded at fold line (e.g., hinge) 211b. However, in this case, the rewind spring 219 opposes this compacted configuration. A temporary spring defastening means 219a (e.g., part of the unfold latch) is provided in one embodiment for releasing the rewind spring 219 when a compacting folding of the device 210 is desired. The spring 219 is configured to be refastened to the deck bottom when the device 210 is again unfolded and the first spool 215d is configured to be wound up against the force of the refastened spring 219 when the device 210 is again unfolded. The first spool 215d may be coupled to the spring 219 by a ratchet mechanism (not shown) that allows for incremental rewinding of the spool 215d against the rewind force of the rewind spring 219. (It is to be understood that when the term, ratchet mechanism is used herein, it is contemplative of various kinds of one-way ratcheting or clutching mechanisms including for example, the freewheel or freehub type used in the back wheels of conventional bicycles and sprag clutches used in engine starter motors.)

In one embodiment, the ΔL reciprocation range of the reciprocatable steering-column 214 may be temporarily limited to a selected subrange within the ΔLmax full reciprocation range of the steering-column 214. Such a temporary limiting may be desirable in a situation such as for example that depicted in FIG. 1A where the vehicle and rider are coasting down an inclined roadway 101 and the rider 105 wishes to keep the deck 111 relatively horizontal for sake of comfort. Subrange selecting means such as spaced apart reciprocation stops 214e and limit range selecting knob 214f may be used for such a feature. Alternatively, the limit stops may be provided on the rewind spool 215d or as feature on the cable length 215 (e.g., by knot points or equivalents provided along the length of the cable).

In the illustrated embodiment 210, the deck back-porch 222 is disconnectably connected to the main deck 211 by way of a bounce spring 221a and a connection angle selecting joint 221b. The deck back-porch 222 is removable from the connection angle selecting joint 221b so that the transport device can be compactly folded (about fold line 211b) when folding is desired. The user 205 can select a desired connection angle as between the main deck 211 and the deck back-porch 222 when attaching the back-porch 222 (and its optionally included bounce spring 221a) when lockably attaching the back-porch 222 to the connection angle selecting joint 221b. In one embodiment, more than one connection angle selecting joint 221b is provided along the length of the main deck 211, with one such connection joint 221b being provided for enabling the rider to shift most of his weight rearward of the deck pivot point 211e and another being provided forward of that position so as to allow the user 205 to see-saw both forward and rearward of the pivot point 211e while standing on the back-porch 222. The user 205 may elect to bounce up-and-down on the back-porch 222. This bouncing action can send a low amplitude, up and down force wave through the bounce spring 221a (from which porch 222 is cantilevered) to the main deck 211 and ultimately to the cable 215. The bouncing action is amplified by the pulley system 214u, 211L and rectified by the motion rectifying means 217a so that energy from the user's bouncing actions is converted into usable one-way rotating energy for storage in storage means 218 and/or for coupling to the rear propulsion wheel 212 of the transport device 210. Accordingly, depending on mood or other disposition, the rider 205 may elect to pump manual energy into the transport device 210 by bouncing up and down on the back porch (e.g., while the deck is limited to a reciprocation subrange by limit means 214e/214f) or by jumping onto or stepping forward onto a selected forward position (see FIG. 1C) on the main deck 211 after causing the deck to pivot into a state that increases the area of its underbelly hypothetical triangle (see FIG. 1C).

It is to be understood that the embodiment 210 shown in FIG. 2A is merely an illustrative example of broader concepts provided herein. It is within the contemplation of the present disclosure to apply similar concepts to three wheeled vehicles, four wheeled vehicles and so on. The coupling between a reciprocatable wheel supported column like 214 and a platform sleeve like 213 may be provided in forms other than as a suspension cable system (e.g., 215/214u/211L) combined with a reciprocated spool (e.g., 215d). For example gears and/or flexible belt or chain loops may be used. The first spool 215d may be rotatably mounted about a bottom portion of the deck sleeve (below flange 213f) and/or so can the rewind spring (e.g., in the form of a torsion spring) rather than being disposed rearward of the deck sleeve 213. The methods by which the first spool 215d may be reciprocatably rotated by forces provided by the vehicle user 205 may vary and may include pulling the top turret 214b upwardly with aid of hand force or pulling on the cable 215 with aid of hand force.

FIG. 2B shows another arrangement 210' in which a rotatable turret 214B' is instead provided at a bottom portion of the reciprocatable steering-column 214' of the vehicle. An anti-compress (pro-expansion) spring 234 works to normally keep the hypothetical triangle formed to have virtual road line 203' as one side thereof and the steering-column 214' and the deck 211' as other sides in a maximized area mode. However, when the user 205' steps or jumps onto the forward part of the main deck 211', that action urges the deck sleeve to slip down along the steering-column and thereby allow a rewindable second spool 215d' to rewind the de-tensioned cable 215' by action of a pro-compression rewind spring 219'. When the user 205' steps off the front of the main deck and for example back onto the back-porch 222' behind the pivot point 211e', the anti-compress spring 234 urges the sleeve 213' back up along steering-column 214' and the rewindable second spool 215d' is unwound by lengthening of cable segments 215a' and 215c' (because cable guiding drum 211U' rises away from the bottom turret 214B' due to its attachment to the rising deck). Although FIG. 2B shows only the bottom turret 214B' being present, it is within the contemplation of the present disclosure to also include in one embodiment, a top side turret such as 214b of FIG. 2A and its associated connections for also driving a shared speed-up gearing 217b. The top side turret (e.g., 214b) may be made liftable by action of folding handle bars 214h'.

Additional possibilities for coupling user output energy to the energy storing and/or converting means 218' (not shown in FIG. 2A but understood to be present along the mechanical and/or electromechanical linkage 218') are shown in less illustratively cluttered FIG. 2B. One option is to have an upper part 214T of the steering-column that telescopes up from the lower part while being rotatably keyed to the lower part so as to provide key driven steering. Each time the user pulls up on the handle bar 214h' with his hands, a third cable or rope 214R that extends from the handle bar area down to the bottom turret 214B' is pulled up and the bottom turret 214B' is thereby pulled up relative to the lower part of the steering-column, thereby coupling additional input energy into the second spool 215d' and ultimately into energy storing/converting means 218'.

In the same or an alternative embodiment, the handle bars 214h' are downwardly foldable about a pivot point 214P disposed at or near the top of the steering-column. Such down-folding may also be used for compacting the device during storage. However, a partial down-folding action of the handle bars 214h' drives a third spool 214Q (by way of appropriate leveraging and/or gearing) to thus shorten the third cable 214R and displace turret 214B' upwardly, thereby transferring user energy output into the onboard energy storing/converting means 218'. Accordingly, if the rider 205' is tired of pumping with his leg muscles (e.g., by bouncing on or between the back-porch 222' and the main deck 211'), the rider may use his arm muscles (and/or other upper torso muscles) to pull up on telescoping steering-column part 214T and/or by partially down-folding the foldable handle bars 214h'. A mechanical limit (not shown) may limit the pivoting range of the foldable handle bars 214h' about pivot point 214P and/or may allow the rider to lock the handle bars 214h' into a desired straight or angled disposition. The illustrated device 210' therefore provides for multiple ways in which a user of the vehicle may exercise different muscle groups of his or her body. Although not shown in FIG. 2B, a further variation may provide one or more retractable pull strings that extend from third spool 214Q back to a rider positioned on the back porch. The rider may repeatedly pull and release on such a retractable pull strings (not shown) while standing on the back porch and thus cause reciprocation of spool 214Q and ultimately of the displacement of sleeve 213' relative to bottom turret 214B'. In a case where two such retractable pull strings (not shown) are provided, they may additionally be used for steering the front-located handle bars while the rider is positioned on the back porch.

FIG. 2B incidentally shows the ability to removably lock the insertion end of back-porch 222' into a selected one of two or more angle setting and location picking connectors 221b' and 221b" along the length of deck 211'. The user may game the way he rides the vehicle 210' by picking a desired connector, e.g., 221b' or 221b" and a desired connecting angle. In one embodiment, bounce springs 221a' with different stiffness coefficients are provided.

Referring back to FIG. 2A, in one embodiment the steering-column 214 is a hollow tube (also referred to at times as the steering inner tube of SIT) and control cables (electrical and/or mechanical) 214g extend from the handle bars 214h by way of the inner hollow of the SIT 214 to controllable mechanisms disposed under the underbelly of the deck 211. These controllable mechanisms may include one or more of a mechanical and/or electro mechanical brake system coupled to the rear propulsion wheel 212. (A motor/generator—not shown—may provide for regenerative braking as well as electrically controlled forward propulsion of the rear propulsion wheel 212.) The controllable underbelly mechanisms may alternatively or additionally include the counterforce setting means (e.g., magnetic field coils) of the energy storing/converting means 218. The controllable underbelly mechanisms may alternatively or additionally include the reciprocation subrange setting means (represented by 214e, 214f) of the transport device 210. The controllable underbelly mechanisms may alternatively or additionally include lighting controls, noise making controls (e.g., horn, music output) or other safety or showoff features of the transport device 210. In one embodiment, a small motor or solenoid (not shown) agitates flag 124" of FIG. 1C for example up and down so it gets more attention. In one embodiment, the user draws attention to himself by activating LED driven lights that point to reflective moving (e.g., reciprocating and/or rotating) parts of his transport device 210. The lights may also define projected and changing light spokes on the pavement below the transport device.

Referring to the perspective view of FIG. 2C, shown here is part of a third embodiment 210" in corresponding environment 203 (where +X represents the forward drive direction of the vehicle). The illustrated part features four spools, two spoollable cables and a spoollable pulley belt. It is to be understood that FIG. 2C is not to scale and its top turret 214b" is shown as if it were much closer to the vehicle deck 211" than in actuality. Per the better view shown in FIG. 2A, a turret supporting flange and an underlying impact bumper 214c are preferably disposed under the top turret 214b" and then part of the on-deck sleeve 213 protrudes above the top surface of the main deck 211. Although the description below of FIG. 2C takes it as a presumption that the illustrated mechanism 210" is disposed at the front end (+X) of a two-wheeled scooter (e.g., that of FIG. 2A), it is within the contemplation of the present disclosure to alternatively or additionally have a copy of the illustrated mechanism disposed at a rear end (and optionally facing rearwardly in the −X direction rather than in the illustrated +X direction) of a two-wheeled scooter and/or disposed at the front and/or back ends of a three-wheeled, four wheeled, and so on PPTA (Pollutionless Personal Transport Apparatus) and serving as part of a suspension and/or shock absorbing subsystem of such a PPTA.

In terms of specifics for the exemplary mechanism 210" of FIG. 2C, a relatively flat belt 215" is provided coupled indirectly (by way of 214u") to a top front turret 214b" where the belt has a first belt segment 215a" whose end (not shown because it is behind spool 215d") fastens to the vehicle main deck 211". The belt 215" then loops over the top of upper pulley drum 214u" and continues with a second segment 215b" to lower drum (a.k.a. first spool 215d") and then continues by way of a continued section 215c" (not fully shown) to spool onto and fasten at its end (at end of 215c") to the unwindable first spool 215d". Although not explicitly shown in FIG. 2C, it is within the contemplation of the present disclosure to provide various kinds of attention-drawing optical decorations, textures, reflective features and/or see-through hole patterns at least on the front facing (+X facing side) of the second segment 215b" of the belt so that, when the belt spools onto and unspools from the first unwindable spool 215d", the various kinds of attention-drawing optical decorations, etc. thereof tend to draw attention of motorists and the like to the reciprocations of the belt 215" to thereby provide a safety feature. At night, reflective portions of the belt 215" can reflect lights from headlights of oncoming cars while reciprocating up and down so that drivers better notice the vehicle 210". In one embodiment, strobed, high intensity LED's may be further provided on the vehicle 210" and disposed for reflecting at least part of their light output off the reflective portions of the belt 215". In one embodiment, some of the high intensity LED's may be disposed within the interior of the open space between the back 215a" and front extension portion 215b" of the belt where see-through hole patterns are provided and the LED light rays flash through the up and down reciprocating portions of the belt 215". In one embodiment, such attention-drawing features are provided both on the back as well as the front of the vehicle. In one embodiment, two opposingly reciprocating belts (not only the one shown) are provided side-by-side so that their attention-drawing features are seen to move in opposite directions, one going up while the other moves downwardly.

The first unwindable spool 215d" is normally urged into a wound state by a first rewind spring 217e" (schematically shown) which couples to the first unwindable spool 215d" by way of expansion gearing 215e". The expansion gearing amplifies the effective stretch distance of the first rewind spring 217e" so that it can cause retraction of a relatively long length of belt material. An opposed end of the first rewind spring 217e" couples to the deck or deck sleeve. The relatively flat belt 215" need not be completely flat or without holes and it may have a self-stackable W-shaped or V W-shaped, etc. cross sectional profile that stacks compactly on itself and simultaneously provides a self centering function when wrapping around the first spool 215d". Hence, as belt end segment section 215c" (not fully shown) spools onto the first unwindable spool 215d", the belt packs efficiently and self-centers itself onto the spool 215d" due to its V-shaped cross sectional portions. The belt engaging drum surface of the first unwindable spool 215d" may have a complementary W-shaped or VW-shaped, etc. cross sectional profile that compactly receives the belt and centers it. The upper pulley drum 214u" may also have a complementary W-shaped or VW-shaped, etc. cross sectional profile that receives the belt and centers it.

The upper pulley drum 214u" attaches to the top turret 214b" where the latter is rotatably supported on a flanged section (214c) of steering-column tube (SIT) 214h". Control cables 214g" (mechanical and/or electrical) are schematically shown extending through an interior hollow of the steering-column tube (SIT) 214h". Since the pulley belt 215" has its not-wound portion of length urged into a minimum length state at least by action of the first rewind spring 217e" and expansion gearing 215e", the top turret 214b" is automatically urged into rotating into a state that points it in the +X direction and centers the upper pulley drum 214u" over a corresponding longitudinal center line of the vehicle deck 211". Additionally, when the self-stacking and self-centering W-shaped or VW-shaped, etc. cross sectional profiles are used at least for the belt and preferably also for the first spool and the upper pulley drum 214u", these features also help in urging the rotatably mounted top turret 214b" to remain pointing in the +X forward direction of the vehicle 210" even as the steering-column tube (SIT) 214h" is turned one way or the other for vehicle steering purposes.

Although not explicitly shown, it is to be understood that the relatively flat belt 215" internally has strong, tension-providing and flexible fibers extending longitudinally in the belt and distributed across and interior-wise located within its cross sectional profile so that the belt can provide strong support for the suspension-wise lifted front end of the deck 211" even, for example, when a rider of predetermined weight and strength jumps high off the back porch and pounds the front (211a) of the deck with all his or her might as the rider comes crashing down against the front of the deck. One or more outer sheath layers of the belt preferably provide a self-lubricating and/or low friction function to the outer surface of the belt 215" so that it wraps compactly about the first unwindable spool 215d" and so the belt slips easily around the upper pulley drum 214u". It may be appreciated that the described belt 215" functions basically as does the above described, pulley cable #1 (215 of FIG. 2A) in that an upward translation of the top turret 214b" by a distance ΔL relative to the deck 211" results in an unwinding from the first unwindable spool 215d" of a length of belt at least equal to two times ΔL. Although not shown, adjacent to the unwound length 215b" (when belt 215" is strongly tensioned) there may be provided one or more additional, belt-length increasing mechanisms that selectively increase the unwound length of the belt. One example is a lever arm (not shown) having a horizontally mounted, rotatable drum on it, where the lever arm (not shown) is urged forwardly (in the +X direction) by user supplied energy and the additional lever arm (not shown) thereby pushes the second segment 215b" of the belt forward (in the +X direction) of the linear path it normally makes when extending between the belt receiving surfaces of upper pulley drum 214u" and spool 215d" so that the unwound length of the belt increases and the reciprocation of the spool 215d" increases. In other words, it is within the contemplation of the disclosure to further increase the length of belt unwound from the first unwindable spool 215d" by other means than just lifting of the upper pulley drum 214u" relative to the deck front when such additional unwinding of the belt 215" is desired (e.g., when a rider steps down hard or stomps down hard on the front of the belt suspended deck 211").

The unwinding of the first spool 215d" by an appropriately tensioned and pulling out of belt 215" results in rotation of further spools 215fA" and 215fB" where the latter, secondary, spools are disposed along lateral sides of the deck 211" and connected to the first spool 215d" by way of displacement-increasing gearing 235 and 245. Although not shown, the diameter of gear-toothed cylinder 245 may be smaller than that of gear-toothed cylinder 235 so that rotational speed is thereby increased. The diameters of the secondary spools, 215fA" and 215fB" are greater than those of their respective coaxial gears 245 (only one shown) so that rotational speed is thereby increased and torque is decreased as power from the belt 215" is converted into a reduced-force and increased-speed format (a.k.a. a speed-expanded/force-reduced format). Axles of gear-toothed cylinders 235 and 245 are supported in corresponding bearings such as 237 and 247 respectively, where the latter bearings (e.g., bushings) are fastened to the deck 211". For purpose of show-off and safety, the outward-facing surfaces (or "faceplates") of each of secondary spools, 215fA" and 215fB" may have attention-drawing features provided thereon such as being decorated with a design (e.g., a spiral, colored and/or reflective pattern) that indicates to others on a street, how quickly the rider 205" (not shown in FIG. 2C) is pumping the deck 211" of his vehicle. In one embodiment, high intensity LED's disposed within the interior hollow of the belt (between 215a" and 215b") shine at least part of their light rays through see-through holes (not shown) provided on the out-facing surfaces (or "faceplates") of spools 215fA" and 215fB". In one embodiment, the attention-drawing faceplates loosely couple by way of one-way ratchet couplings (not shown) to their respective secondary spools, 215fA" and 215fB" so that the faceplates rotate in only one direction due to inertial effects even as the respective secondary spools reciprocate opposingly in response to belt 215d" unwinding from and then rewinding back onto the first spool 215d". In other words, these inertial faceplates indicate how much energy has been recently pumped manually by the user into the on-board energy storing system (see 218 of FIG. 2A) and, in order to keep the inertial faceplates rotating in their ratchet-dictated one direction, the user has to keep pumping away at a relatively steady pace. Of course, a similar show-off of the energy that has been recently pumped manually by the user into the on-board energy storing system (e.g., 218) may be provided by other means including, but not limited to, a small electrical motor that is controlled by an on-board microcomputer to rotate at a speed representative of recently input energy and/or optical indicators (e.g., LED's, micro-mirrors, etc.) that are controlled by the on-board microcomputer (not shown) to indicate in the form of a large bar graph or pie chart that can be easily seen by on-lookers. The show-off means can show how much energy relative to a predetermined maximum amount (last largest record amount) has been recently pumped manually by the user into the on-board energy storing system (e.g., 218).

Each of the secondary spools, 215fA" and 215fB" has a respective secondary cable that spools onto it, where in FIG. 2C and for the sake of avoiding illustrative clutter, only the left side secondary cable 255 (a.k.a. cable #2A of cable pair #2A and #2B) is shown. The respective left and right side secondary cables (#2A and #2B) respective pass by the left and right sides of the deck sleeve (not shown, see instead 213 of FIG. 2A) to loop onto one or more tertiary spools 256 disposed rearward of the deck sleeve (213). The tertiary spools 256 are normally urged into wound states by corresponding secondary rewind springs 219b" (only one shown) which may couple indirectly to the one or more tertiary spools 256 by way of displacement-expanding gearings (not shown, but similar to 215e"). Since the reciprocation power from the belt 215" is split onto two cables (#2A and #2B) and since there is a speed-expanding/force-reducing means (e.g., 235, 245) interposed between the belt 215" and the secondary cables (#2A and #2B, a.k.a. secondary flexible tension means), the tension applied to each cable as the rider jumps onto the front of a lifter deck 211" is much reduced in comparison to the tension sustained by the belt 215". As a result, the secondary cables (#2A and #2B) may be made of a lighter in weight and relatively less expensive material such as a small diameter wire rope covered by a slippery plastic tubing (e.g., vinyl). The secondary rewind springs 219b" (only one shown) provide a functional back up for the first rewind spring 217e" so that, if the first rewind spring 217e" breaks for some reason, the power input system continues to work because the secondary rewind springs 219b" indirectly urge the first unwindable spool 215d" to rewind.

While not shown in FIG. 2C, it is to be understood that the reciprocation power of the tertiary spool(s) 256 is coupled by way of a rectifying means (e.g., 217a of FIG. 2A which could include one or a pair of ratchets) and optionally further by way of a speed-expanding/force-reducing means (e.g., 217b of FIG. 2A which could include one or more speed increasing gear sets) to an appropriate energy receiving and storing and/or energy using means (e.g., 218 of FIG. 2A). Energy from the storing/using means (e.g., 218) may thereafter be coupled to one or more propulsion means of the vehicle.

Figure 3A:
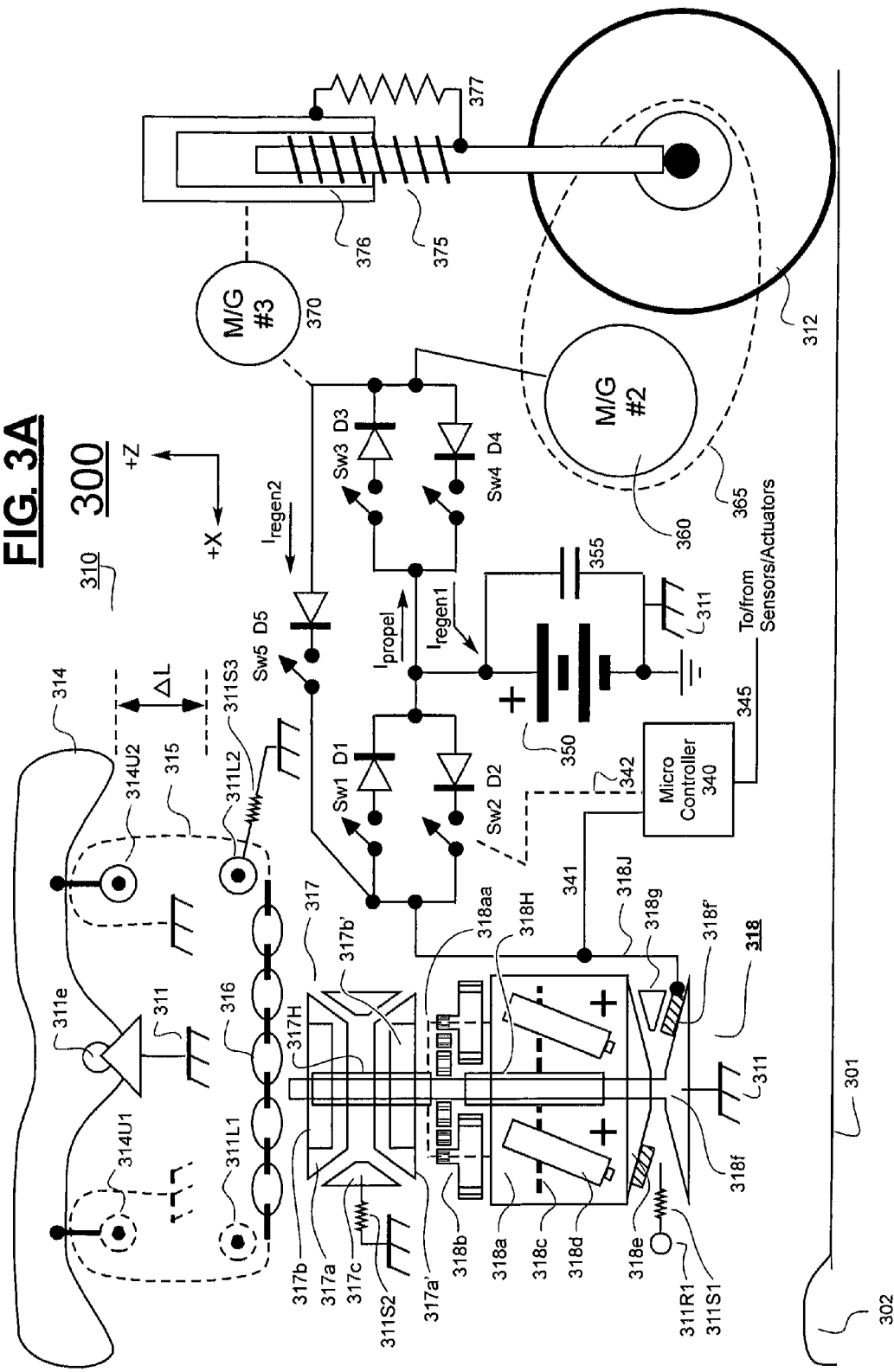
FIG. 3A is a schematic side cross sectional view of a third transport vehicle having a rockable top deck and an under-deck motor/generator whose housing rotates as a flywheel mass and in a direction opposite to its rotor.

Referring to FIG. 3A, another system 300 in accordance with the present disclosure is schematically illustrated. It is to be understood that, where practical, like reference symbols and numbers in the "300" century series are used for elements of FIG. 3A which correspond to, but are not necessarily the same as the elements represented by similar symbols and reference numbers of the "200" century series in FIGS. 2A-2C. As such, a repeated introductory description of some elements found in FIG. 3A is omitted here. The more notable features of the embodiment 300 of FIG. 3A include: (1) a horizontal rocker board 314 that rocks on pivot point 311e of a vehicle frame 311 (where 311 is schematically represented); (2) a reciprocatable belt-plus-chain 315 that saws back and forth as a user (not shown) rocks the rocker board with his feet; (3) a suspended, first combination of electrical generator and motor 318 that has an internal rotor 318c configured for spinning in one direction and an outer body 318a configured for spinning at a slower speed in an opposed second direction; (4) a first set of rechargeable batteries 318d mounted to the spinning outer body 318a of the first generator/motor 318; (5) a second set of rechargeable batteries 350 mounted to the relatively stationary frame 311 (shown schematically) of the vehicle 310 and electrically interposed between the first generator/motor 318 plus its on-body rechargeable batteries 318d and a second generator/motor 360 that generates current from regenerative braking of, and drives a coupled thereto, vehicle propulsion wheel 312; and (6) rolling commutator bearings 318g that support the spinning outer body 318a and provide electrical commutation as between circuitry within the rotating outer body 318a and circuitry (e.g., 340) of the relatively stationary frame 311.

The identified features and yet others will now be detailed in turn.

In place of having a reciprocatable and approximately vertically disposed steering-column such as 214h" of FIG. 2C, the embodiment 300 of FIG. 3A has a non-reciprocatable steering-column (not shown) and a rockable secondary deck 314 pivotally mounted on a pivot point 311e formed approximately midway along the length of a main frame 311 (only schematically shown) of a corresponding, two or more wheeled vehicle 310. Two rotatable pulley drums, 314U1 and 314U2 are mounted to a bottom surface of the rocker board 314. A rocking displacement of ΔL at either end of the rocker board 314 results in a length displacement of 2 times ΔL for a two-piece belt 315 that has U-shaped loops wrapping about the pair of pulley drums, 314U1 and 314U2 and has opposed ends fasted to the frame 311.

A reciprocatable chain segment 316 is interposed between the end pieces of the two-piece belt 315, where it (the segment 316) saws back and forth horizontally by a distance of 2*ΔL for each approximately vertical displacement by ΔL of one end of the rocker board 314. As seen in FIG. 3A, the chain-driving belt 315 may loop 90 degrees about each of lower drums, 311L1 and 311L2 where the latter are substantially fastened to the frame 311. An idler spring or other elastic means 311S3 may be interposed between the frame and an axle of at least one of the lower drums, 311L1 and 311L2 for tensioning the series combination of belt and chain, 315/316.

For purposes of clearly showing both the reciprocatable chain segment 316 and a first 317a of two ratchet drums, 317a and 317a' with which the chain segment 316 engages (by meshing with sprockets—not shown—on the outer diameter of first ratchet drum 317a), the chain segment 316 is illustrated as if disposed above the first ratchet drum 317a although in the actual assembly, the chain segment 316 is disposed at the same level as, and engages with the sprockets of the outer diameter of first ratchet drum 317a so as to force that outer diameter to reciprocatably rotate in correspondence with the horizontal reciprocations of the chain segment 316. The outer diameter of the first ratchet drum 317a couples to the outer diameter of the second ratchet drum 317a' by way of frusto-conically shaped reversing rollers 317c so that, when the first ratchet drum 317a rotates clockwise (cw), the outer diameter part of the second ratchet drum 317a' opposingly rotates in a counter-clockwise (ccw) direction about a shared vertical axle or shaft (318O. Each of the first and second ratchet drums includes a respective inner diameter portion, 317b and 317b' (e.g., a ratchet-toothed disc) that couples by way of a one-way ratcheting mechanism (e.g., spring tensioned pawls and ratchet teeth—not shown, where tensioned pawls may be disposed within and around the drum outer diameters) to the corresponding drum outer diameter, 317a and 317a' so that a first centrally-hollow shaft 317H is selectively urged to rotate in a predetermined one direction (e.g., clockwise) by one or the other of the inner diameter portions, 317b and 317b', when the outer diameter portion of that ratchet drum is driven in a non-slip direction of its respective ratchet mechanism. (In one embodiment, items 317b, 317b' and 317H are one unitary body over which independent ratchet drums 317a and 317a' are slid onto.) Accordingly, the 2*ΔL horizontal reciprocations of the chain 316 are converted (mechanically rectified) into one-way forced rotations of the first centrally-hollow shaft 317H. As shown in FIG. 3A the first shaft 317H is rotatably mounted about the stationary support shaft 318f of a combination of a first motor/generator (318) and a planetary gears box and a reciprocation rectifying means 317 that is being described here. The frusto-conically shaped reversing rollers 317c each has a respective axle fastened to the vehicle frame 311. In one embodiment, an independent spring means 311S2 (only one shown) biases each of the reversing rollers 317c inwardly toward the central support shaft 318f of the combination motor/generator-gears- and rectifying means, 318-318b-317. (It is to be understood that where the term "frusto-conically shaped roller" is used herein and unless otherwise specified, it includes the option of complete cones and/or the option of tapered rollers whose profiles comport with the tangent theta teachings of the here incorporated U.S. Provisional Ser. No. 61/462,134.)

The first centrally-hollow shaft 317H couples to a rotatable housing 318aa (represented schematically by dashed lines) of a planetary gears system 318b. The rotatable gear box or housing 318aa is additionally coupled to a rotatable outer housing 318a of the first motor/generator 318. Thus, as the first centrally-hollow shaft 317H rotates relative to the central support shaft 318f and relative to the rest of the frame 311, the combined mass of the rotatable gear box 318aa (and contents thereof that rotate with it) and that of the rotatable outer housing 318a of the first motor/generator (and contents thereof that are forced to rotate with it) define part of a first flywheel mass that rotates in a predetermined one-direction (e.g., clockwise) due to action of the motion rectifying means 317. In one embodiment, that first flywheel mass further includes the mass of rechargeable and optionally removable electrical batteries 318d disposed about and fastened to the outside of the rotatable outer, motor/generator housing 318a. Accordingly, rider energy provided by way of the rockable upper deck 314 and its pulley-wise driven and reciprocating chain 316 is stored at least partially into a first flywheel mass that rotates, as will be shortly seen, at a relatively slow, first flywheel rotation rate (RPM1).

As the rotatable gear box 318aa rotates relative to the fixed central shaft 318f, the gear box 318aa propels a symmetrical set of planetary gears 318b that rotatably mount within the gear box 318aa about and in engagement with the fixed central shaft 318f (or a gear fixed thereto, not shown). The planetary gears 318b define a plurality of speed expanding gear trains having inputs coupled to the fixed central shaft 318f and outputs coupled to a second centrally-hollow shaft 318H. (For sake of illustrative clarity, the coupling of 318b to 318H is not explicitly shown. As should be apparent, here, the term, "speed expanding" refers to the opposite of speed reducing.) The planetary gears 318b are configured such that the second centrally-hollow shaft 318H will rotate in a direction (e.g., counter-clockwise (ccw)) opposite to the rotating direction of the outer housings 318a/318aa and at a faster, second rate of rotational speed (RPM2>RPM1). The second hollow shaft 318H couples to a rotor mass 318c disposed inside the outer and counter-rotating housing 318a of the first motor/generator 318. The fast spinning rotor 318c (which may include composite fibers for strength) defines a second flywheel mass into which energy sourced from the rider is inertially stored. Appropriate electro-magnetic coils and ferromagnetic yoke pieces, permanent magnets (optional) and so on are provided within the first motor/generator housing 318a so as to define, in one instance, an electrical generator that can convert the relative rotary motion between the housing 318a and the counter-rotating rotor 318c into electrical energy and so as to define, in a second instance, an electrical motor that can receive electrical power from an electrical battery (e.g., 318d, 350) or other source (e.g., second motor/generator 360) and can convert that received electrical power into kinetic energy that is temporarily storable in the counter-rotating flywheel masses defined by the rotor 318c and the counter-rotating combination of motor/generator housings, gears and rectifying means, 318-318b-317. That temporarily stored kinetic energy may thereafter be re-converted into pulsed electrical energy that is used for at least one of trickle or pulse based charging of one or more on-board electrical batteries (e.g., 318d, 350) and for driving one or more on-board, other electrical motors (e.g., 360 which may couple to the rear wheel by way of a belt or chain drive 365). In one embodiment, at least part of the second hollow shaft 318H electrically couples to the system electrical ground and so does at least part of the fixed central shaft 318f.

It is to be observed that the charging (as well as discharging) of electrochemical batteries (e.g., 318d, 350) is an electrochemical process and hence, reaction time and speed may be comparatively longer/slower than the corresponding time frame and rate at which electrical power of a given format (e.g., high intensity and short lived) is provided from an external source for charging and storage into the electrochemical batteries. Similarly, battery discharge time and speed may be comparatively longer/slower than the corresponding time frame and rate at which electrical power of a given format (e.g., high intensity and short lived) is to be desirably delivered by way of discharge out of the electrochemical batteries to a predetermined load (e.g., 360). The kinetic energy storing flywheel masses define one intermediate means for storing energy. It is of course within the contemplation of the present disclosure to incorporate super or ultra-capacitors and the like (which could be included in capacitance means 355) for ameliorating the problem. However and as mentioned, it is further within the contemplation of the present disclosure to temporarily store energy of impulsive format (e.g., high intensity power that is short lived) within what may be termed, as more "primitive" means, such as the mentioned spinning flywheel masses of the rotor 318c and the combination motor/generator housings-gears- and rectifying means, 318-318b-317, where that temporarily stored kinetic energy may thereafter be re-converted into electrical energy that is used for at least one of slow trickle charging of one or more on-board electrical batteries (e.g., 318d, 350) and/or driving one or more on-board, other electrical motors (e.g., 360). The more "primitive" and temporary energy storage means may alternatively or additionally include a weight lifting mechanism 370-375/376 (not fully shown) which temporary lifts at least part of the weight of the rider and of the vehicle so as to thereby store energy as potential energy (E=m*g*Δh) and to afterwards recover that stored energy by regenerative lowering of the weight of the rider and/or vehicle portion at times where an extra boost of electrical energy is desired. Potential energy may alternatively or additionally be temporarily stored in a spring means 377 (e.g., including an optional air compressing means or hydraulic means, not shown). To that end, FIG. 3A shows as an example, a third motor/generator 370 operatively coupled to a weight-lifting screw 375 or nut 376 where rotation of one of these transforms electrical energy into recoverable potential energy that is later recouped by selective and regenerative lowering of the lifted weight. The same or yet another motor/generator may be operatively coupled to a spring means 377 for temporarily storing recoupable energy therein. The spring means 377 may be part of a shock absorbing suspension system of the vehicle. Although in the framework of the embodiment 300 of FIG. 3A, the potential energy storage option (E=m*g*Δh) is shown in the form of a weight-lifting screw 375 or nut 376, it is within the contemplation of the present disclosure to alternatively or additionally use the belt and pulley type of weight suspension approach depicted in FIGS. 2A-2C. In other words, and in the case of FIG. 2C for example, a rewind motor and/or rewind clutch (not shown) could be operatively coupled to the third unwindable spool 256 thereof and used to rewind the spool 256 when the deck 211" is in a lowered position and the rider has his weight shifted mostly to the front of the deck. More specifically, this can occur while the vehicle is in regenerative braking mode. In that case, the winding up of third spool 256 will cause a corresponding winding up of belt spool 215d" and a lifting up of the deck 211", and weights thereof and thereon, so as to rapidly store regenerative braking energy as potential energy (E=m*g*Δh). Then, afterwards, the belt spool 215d" is more slowly unwound, and/or unwound in steps that allow for slow charging of the on-board electrical batteries (e.g., 318d, 350).

FIG. 3A includes a schematic for a simple electrical circuit (as an example) which may be used for controlling the flow of electrical current from the first motor/generator 318 to one or both of external battery 350 and external motor/generator 360 when the first motor/generator 318 is operating in generator mode.

In the illustrated embodiment, electrical power and electronic control signals are conveyed between the slow rotating motor/generator housing 318a and external circuitry by means of a set of commutating tapered rollers 318g. While not shown, it is to be understood that the rollers 318g may be made of a slightly elastic and insulative material (e.g., a resilient plastic) that has opposed electrical contact pads (e.g., metallized ones) disposed about the surface of the conical shell of each roller 318g. Corresponding further contacts (e.g., 318f on a conical bottom support surface of shaft 315f) are provided about a conical bottom area 318e of the housing 318a and a conical top area of a bottom portion of the fixed support shaft 318f. The contacts are spaced so that, as the commutating tapered rollers 318g collectively revolve about the bottom portion of the fixed support shaft 318f, commutating electrical connections are made between the contacts (e.g., 318f') on the fixed support shaft 318f and the contacts on the housing bottom portion 318e. The rotational angle or phase of the housing bottom portion 318e relative to the support shaft 318f may be signaled by one or more of different means, including, but not limited to, optical, capacitive and/or magnetic sensing and/or position coding means. The rotational angle or phase of the housing bottom portion 318e is communicated to an on-board micro-computer or micro-controller 340 which then determines how various ones of the commutated power and/or control signals are to be used. In one embodiment, a slow rotating ring 311R1 (only partly shown in cross section) has radially inward urging springs 311S1 (only one shown) that connect to respective ones of the commutating rollers 318g (only one shown) and urge them inwardly to become centered between, and to make good electrical contact with, the contacts of the housing bottom 318e and of the shaft bottom. If desired, the ring 311R1 and its radially urging springs 311S1 may be used for coupling electrical signals between the inside of the first motor/generator housing 318a and external circuitry. In one embodiment, the ring 311R1 electrical connects to the set of batteries 318d mounted on the rotatable motor/generator housing 318a so that those batteries 318d can be charged or discharged via the ring connection even if the housing 318a is not rotating. The ring may have a magnetic coupling coil (not only one shown) disposed within its center for receiving and transmitting AC control signals which are conveyed between internal electronics of the motor/generator housing 318a and an external control means (e.g., 340). Additionally, the half-speed rotating ring (311R1) may have optical phase encoding marks thereon that can be read by the external microcontroller 340 for determining the phase angle of the commutating contacts and also the phase angles relative to the fixed shaft 318f or rotating internal parts (e.g., rotor poles and stator poles) of the first motor/generator 318.

It is to be understood that the slow rotating motor/generator housing 318a contains its own electronics (e.g., a counterpart micro-computer or micro-controller like 340) that are configured to be in coordinated communication with the external micro-controller 340. Packet signals or the like may be transferred as between the housing internal electronics (not explicitly shown) and the out-of-housing electronics (340, etc.) for coordinating operations occurring within and outside of the slow rotating motor/generator housing 318a. More specifically, one of the coordinated operations may include control as to whether electrical energy generated by the first motor/generator 318 is to be stored into its on-board and co-rotating batteries 318d and/or into the external batteries 350 and if so in what proportions and when. Another of the coordinated operations automatically determines if the first motor/generator 318 is in generator mode or in motoring mode or neither (idle or free flywheeling mode). Yet another of the coordinated operations determines if the second motor/generator 360 is in generator mode (e.g., regenerative braking mode) or in motoring mode or in free wheeling idle mode. The illustrated third motor/generator 370 similarly can be automatically controlled to be in one or another of the generator mode, motoring mode and free wheeling idle mode as may be appropriate.

FIG. 3A shows a simple power flow circuit arrangement (switches and diodes) for purpose of explaining how electrical power and other forms of energetic power may flow from one part of the system to the next. More complex circuitry may be used in its place. The on-board micro-computer or micro-controller 340 is operatively coupled to a plurality of sensors lines and actuator or user control lines 345. One of the control lines (345) carries braking request signals supplied from a user control knob (not shown) mounted on the vehicle steering handles. Another of the control lines (345, not separately shown) carries current speed information that informs the micro-controller 340 of how much speed, and therefore how much inertial energy ($0.5*M*V^2$) is currently available for possible capture by regenerative braking. If the amount of energy to be bled off for providing the desired braking operation is above a predetermined threshold, the micro-controller 340 initiates a regenerative braking operation. If not, heat dissipating braking is instead employed. For regenerative braking, the secondary motor/generator 360 is switched into generator mode. Switches Sw4 and Sw5 are alternatively closed and reopened so that a portion of the regenerative braking power flows (e.g., through diode D4 and as current $I_{regen1}$) into the stationary batteries pack 350 while another portion of the regenerative braking power flows (e.g., through diode D5 and as current $I_{regen2}$) into the primary motor/generator 318 where the latter has been switched into motoring mode by the micro-controller 340. The primary motor/generator 318 temporarily stores its received portion of the regenerative braking power as kinetic flywheel energy.

After a zero or otherwise reduced vehicle speed has been achieved (signaled by the user easing off on the braking control knob and/or by voltage from M/G 360 dropping below a predetermined threshold), switches Sw4 and Sw5 are left open. The primary motor/generator 318 is then switched into generator mode by the micro-controller 340. Then, the micro-controller 340 begins to repeatedly close and open switch Sw1 so that trickle charging current flows through diode D1 to further charge the stationary batteries 350. Alternatively or additionally, the micro-controller 340 could have, even at an earlier time, switched the primary motor/generator 318 into generator mode and commanded that rotating body to begin pulse charging its rotating batteries set 318d by converting its prestored flywheel energy into electrical energy. The prestored flywheel energy may be used to alternatingly pulse charge two or more on board batteries such as 350 and 318d. (Not all batteries within either of sets 350 and 318d need to be simultaneously charged.) In one embodiment, the rotating batteries set 318d are cooled off after each charging round by air surrounding the rotating primary M/G housing 318a. As shown in FIG. 3A, the rotating batteries 318d may be mounted at a tilt angle relative to the rotational axis (318f) of the housing 318a so they define or are part of an air flow creating set of fan blades. Since heat of charging is well dissipated into the ambient by the air flow, the chemical process is less likely to reverse and create an undesirable self-discharge within the rotating batteries set 318d. If the ambient is too cold for charging, resistive and/or other forms (e.g., magnetic) of pre-heating may be used to bring the batteries to a desired charging temperature. One of the sensor feeds (345) into micro-controller 340 can be configured for indicating battery temperature and/or other battery state information. (In one embodiment, the batteries include a ferromagnetic material (e.g., nickel and/or iron) and pulsed magnetic fields are used to excite the battery interiors for purpose of aiding in chemical charging and/or discharging as shall be explained in conjunction with FIG. 3B.)

Let it be assumed that a regenerative braking operation has been used for bringing the vehicle (e.g., 310) to a full stop because the driver has encountered a 3 minute or longer red light at a traffic intersection. While the vehicle is stopped, the driver continues to inject more energy into the system by for example pumping on the rocking deck 314. (He could alternatively or additionally inject more energy into the system by jumping up and down on a part connected to rear suspension 375 while the third M/G 370 is switched into generator mode.) The user's pumping energy is stored as kinetic energy into the on-board flywheel masses and thereafter used to trickle charge the on-board electrical batteries (e.g., 350 and 318d). Some of the user's pumping energy may be stored as potential energy by switching the third M/G 370 into motor mode and raising the deck and its onboard weight just prior to acceleration. Alternatively or additionally, some of the user's pumping energy may be stored as spring energy, compressed air energy, hydraulic energy or otherwise in corresponding energy storage means where the stored energy is later bled back into the system batteries and/or flywheels.

By the time the traffic light turns from red and back to green again, some of the user's idle time energies will have been pre-stored into the system as electrical energy (stored in the batteries and/or onboard capacitor means 355) and/or some of the user's idle time energies have been pre-stored into the system as potential energy (e.g., by lifting onboard weights) and/or some of the user's idle time energies continue to be stored in the flywheels as kinetic energy ($0.5*M*V^2$). One or more of these stored energy forms can be brought into use for powering the secondary M/G 360 (which is now switched by the micro-controller 340 into motoring mode) as rider and vehicle quickly accelerate up to a desired intersection crossing speed at an appropriate (e.g., safe) time. More specifically, switches Sw1 and Sw3 may be simultaneously closed by the micro-controller 340 so as to deliver a large propulsion starting current ($I_{propel}$) to the rear drive motor 360. The user then continues to pump on rocker board 314 while the primary M/G 318 is in generator mode, thereby producing further electrical energy for powering the rear drive motor 360 as he continues to coast after accelerating to coasting speed.

Switch Sw2 may be closed in some situations where it is desirable to increase the rotational speed of the housing 318a such as for cooling off the air cooled batteries 318d and/or partly discharging batteries set 350 into the rotatable batteries 318d so that additional charge can be added to stationary batteries set 350 from an external source. Control coupling 342 (dashed line) is representative of control couplings between the micro-controller 340 and various ones of its controlled switches (e.g., Sw1-Sw5).

Figure 3B:
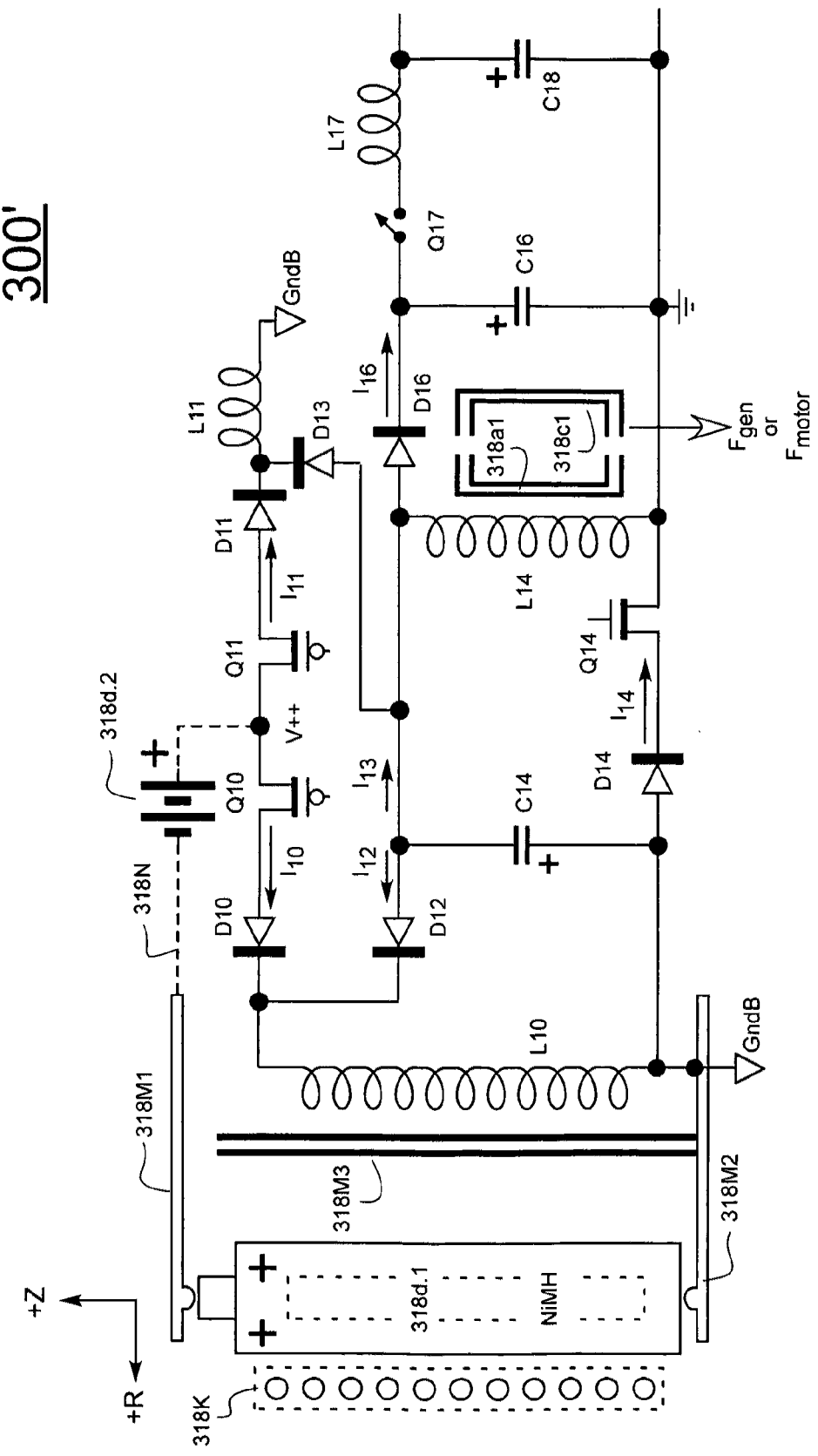
FIG. 3B is a combined electrical and mechanical schematic showing a way of using battery energy to excite a motoring mode and generator mode of a motor/generator such as that of FIG. 3A.

Referring to FIG. 3B, shown here is one possible electrical-magnetic circuit system 300' that may be included within the vehicle of FIG. 3A. Battery 318.d1 is exemplary of the plural batteries 318d mounted about the periphery of the rotatable M/G housing 318a and optionally disposed to define air drawing fan blades where the air may be used to dissipate heat of charging and/or of discharging from the batteries 318d. In one embodiment, a porous and resilient member 318K (e.g., made of a foamed plastic) is disposed radially beyond the battery 318.d1. The retained on its outer side by a relatively rigid wall of a battery retaining tube (e.g., a plastic tube with holes in its walls, not shown). As the rotational speed of the housing 318a changes, varying centripetal forces are applied against the battery 318.d1 and the resilient member 318K resiliently absorbs these while allowing the battery 318.d1 to shift slightly in its contacting position with upper and lower battery contact members 318M1 and 318M2. The battery contact members 318M1 and 318M2 are preferably coated with a corrosion resistant material such as a nickel alloy. However, grease and grime may nonetheless work its way into the contact interface and disadvantageously increase resistance at the contact interface. However, the slight shifts of position of the battery 318.d1 due to varying centripetal forces clears away such grease and grime and helps assure a good, metal-to-metal contact between metal electrodes of the battery 318.d1 and the contact areas of the battery contact members 318M1 and 318M2.

In one variation of the embodiment of FIG. 3B, the on-housing rotatable and rechargeable batteries 318d use at least one ferromagnetic material (e.g., nickel and/or iron) as a major anode or cathode material. Examples of such possibilities include nickel metal hydride batteries (NiMH), nickel cadmium batteries (NiCd) and nickel iron batteries (NiFe). In one embodiment, the battery contact members 318M1 and 318M2 include a ferromagnetic material so that these battery contact members can well conduct a magnetic flux. Moreover, a third magnetic member 318M3 (ferromagnetic but not electrically conductive) may be disposed between the first and second battery contact members 318M1 and 318M2 so as to define part of a magnetic loop. A first inductive coil L10 is wrapped around the third magnetic member 318M3. There can be a small gap between the third magnetic member 318M3 and one of the contact members (e.g., 318M1). When the first inductive coil L10 is excited by an electrical current ($I_{10}$), magnetic flux is induced through at least the first through third magnetic members 31M1-318M3 and the contact interface to the battery electrodes is thereby reinforced. Additionally, AC type magnetic flux flow through the core of battery 318d.1 may excite ferromagnetic components within the battery for purpose of increasing a rate of desired charge or discharge therein. It is also within the contemplation of the present disclosure to apply a DC type magnetic flux flow through the core of battery 318d.1 for purposes of orienting ferromagnetic components within the battery into a desired steady state orientation for better storage (e.g., less self-discharging) of electrical energy that is chemically stored therein.

The first inductive coil L10 is part of a DC-to-DC switched inverter circuit that additionally includes a first switcher transistor Q10, diodes D10, D12 and capacitor C14. Battery 318d.1 may be directly connected to a V++ node of the switched inverter circuit or coupled thereto as part of a series of additional (and optionally like situated) batteries 318d.2. Dashed line 318N represents the optional different couplings of battery 318d.1 to the V++ node (directly or indirectly by series coupling by way of one or more other batteries). When switcher transistor Q10 is temporarily turned on (made conductive), a surge of excitation current ($I_{10}$) flows through coil L10 and a magnetic flux is induced in the magnetic circuit of that coil. Then the switcher transistor Q10 is quickly turned off and the flux field starts to collapse. As a result, an EMF is induced in coil L10 which causes a second current, $I_{12}$ to flow through diode D12 while creating stored charge in capacitor C14. The voltage that develops across capacitor C14 will depend on how much current is so drawn out of it by the induced EMF and also on how many times the excite and collapse process is repeated before capacitor C14 is discharged through an output pathway. In one embodiment, coil L10 and transistor Q10 are not the only switcher components driving capacitor C14. At least one more, and preferably a more efficient, combination of a second switcher transistor Q11, diodes D11, D13 and a second inductive coil L11 are operatively coupled to driven capacitor C14. The second inductor (L11) is more efficient than the first inductor (L10) because the magnetic loop (not shown) of the second inductor (L11) is a closed one (e.g., a toroid of ferromagnetic material) whose magnetic energies are not dissipated in exciting an electromechanical gap and/or an electrochemical reaction as are the energies of the first inductor (L10). L11 connects to GndB. For the case of the second inductor (L11), the second switcher transistor Q11 is temporarily turned on under control of the on-board microcontroller 340 (not shown in FIG. 3B), a corresponding surge of second excitational current ($I_{11}$) flows through coil L11 and a magnetic flux is induced in the magnetic circuit of that coil. Then the second switcher transistor Q11 is quickly turned off and the corresponding flux field of the second inductor (L11) starts to collapse. As a result, an EMF is induced in coil L11 which causes a further current, $I_{13}$ to flow through diode D13 while creating additional stored charge in capacitor C14. The microcontroller 340 (not shown) is programmed to decide how often (and if at all) and to what degree the magnetic circuit of the first inductor (L10) will be excited versus how often (and if at all) and to what degree the magnetic circuit of the second inductor (L11) will be excited. In this way, the microcontroller 340 determines the degree to which (if at all) the electromechanical gap associated with and/or the electrochemical reactions within the first battery 318d.1 will be magnetically excited.

The voltage built up in the switcher capacitor C14 after one or more switcher cycles is subsequently discharged into a further coil L14 when the microcontroller 340 (not shown in FIG. 3B, see instead 3A) decides to temporarily turn on a third transistor Q14. The corresponding current, $I_{14}$ flows through diode D14 and induces a magnetic flux in the magnetic loop circuit of the third coil L14 where that magnetic loop circuit includes a relatively stationary yoke piece 318a1 (e.g., one fastened to the housing 318a—not shown—of M/G system 318) and a movable yoke piece 318c1 (part of the fast spinning rotor 318c of M/G system 318). It is to be understood in this context that the housing-external microcontroller 340 controls housing-internal control circuitry connected to (not explicitly shown, but operatively coupled to the gates of) the switcher transistors Q10, Q11 and to the stator exciting transistor Q14 whereby the timings and durations of turning on and off of those transistors Q10-Q14 is determined. The timing of the turning on of the third transistor Q14 determines whether the primary motor/generator 318 is in motoring mode or generator mode. The voltage developed on switcher capacitor C14 determines the amount of power that can at a moment be discharged into motor/generator coil L14.

If the magnetic gap distance between relatively stationary yoke piece 318a1 and faster-movable yoke piece 318c1 is at, or close to minimum when M/G exciting current $I_{14}$ flows through the motor/generator coil L14 and an external force $F_{gen}$ forces that gap to widen rapidly thereafter, then an EMF will be induced in the motor/generator coil L14 and that induced EMF can drive a generated current $I_{16}$ through corresponding diode D16 for charging collector capacitor C16. Switch Q17 and low pass filtering inductor L17 are optionally included for processing the power format of collector capacitor C16 and transferring the reprocessed power format into output capacitor C18. The substantially DC voltage developed across output capacitor C18 may then be coupled to one or more load circuits including a battery trickle charging circuit (not shown) which is connected to charge at least one of rotatable battery 318d.1 or out-of-housing batteries 350 (FIG. 3A).

If the magnetic gap between relatively stationary yoke piece 318a1 and movable yoke piece 318c1 is close to, and approaching, but not yet at a minimized gap state when M/G exciting current $I_{14}$ flows through the motor/generator coil L14, then the exciting current $I_{14}$ can induce a gap-closing force $F_{motor}$ and thus, the primary motor/generator 318 is placed in a motoring mode. The magnitude and duration of M/G exciting current $I_{14}$ can determine the corresponding magnitude of motoring force $F_{motor}$ or of the counter force that resists the generator driving force, $F_{gen}$. In one embodiment, the user of the vehicle has access by way of on-handlebar control knobs to a control setting for setting of the counter force that resists the generator driving force, $F_{gen}$ to a desired level. Therefore, the user can vary the amount of counterforce that the generator (318) will present against the energy input activities (manual pumping activities) of the user. For example, when coasting downhill, the user may elect to decrease the counter force that resists the generator driving force, $F_{gen}$ so as to thereby define a lower counter braking force of desired magnitude because the user's manual power is not then as much needed for supporting the downhill cruising speed. The user can still generate some manual power for storage and later use if he so decides.

Referring to FIG. 3C, shown is a schematic perspective view of a motor/generator design 300" that may be used in one or more places within a mechanism (e.g., transport device) that has need for combined electrical generator (of low RPM type) and motoring mode functionalities. The illustration is not to scale and some parts are rotated out of more-compacting orientations and/or are elongated so that they can be better seen. Other parts are not shown so as to reduce illustrative clutter. The motor/generator design 300" has three major sections: (1) a relatively stationary (e.g., slower turning) middle housing portion 318HM; (2) a top rotor disc portion 318RT and (3) a bottom rotor disc portion 318RB. In one embodiment, the top and bottom rotor disc portions, 318RT and 318RB are joined to one another by a centrally hollowed rotor shaft (not shown) that passes axially through, and is rotatable relatively to, the middle housing portion 318HM. The rotor shaft (not shown) and its attached top and bottom rotor disc portions, 318RT and 318RB, typically rotate at a relatively high RPM and in an opposed direction relative to the relatively stationary (e.g., slower turning) middle housing portion 318HM. The outer diameters of the top and bottom rotor disc portions, 318RT and 318RB may include composite fibers for strength against centripetal forces.

The bottom rotor disc portion 318RB has a plurality of U-shaped magnetic yoke pieces (only two fully shown: $U_{3a}$ and $U_{3c}$) distributed about a cylindrical shell region thereof that has a radius denoted as R3. The top rotor disc portion 318RT also has a plurality of U-shaped magnetic yoke pieces (only one fully shown in an upside down U orientation: $U_{3b}$) distributed about a cylindrical shell region thereof which has the same radius, R3. Between the upright U-shaped magnetic yoke pieces (e.g., $U_{3a}$ and $U_{3c}$) of the bottom rotor disc portion 318RB and the inverted U-shaped magnetic yoke pieces (e.g., $U_{3b}$) of the top rotor disc portion 318RT there are disposed a plurality of straight stem, magnetic yoke pieces (e.g., Y0, Y1, . . . , Y4) having respective pole ends distributed about an R3 cylindrical shell and fastened to the middle housing portion 318HM. The pole ends (e.g., Y11 and Y10 of yoke stem Y1) of the straight stem, magnetic yoke pieces are simultaneously alignable with opposed pole ends of the U-shaped magnetic yoke pieces (e.g., $U_{3a}$ and $U_{3b}$) such that magnetic flux conducting paths of relatively high permittivity can be formed for conducting a magnetic flux field (e.g., having segments F3a-F3b) through the ferromagnetic materials of the U-shaped magnetic yoke pieces (e.g., $U_{3a}$ and $U_{3b}$) and the intervening straight stem, magnetic yoke pieces (e.g., Y1). Because, in the illustrated example, the upright U-shaped magnetic yoke pieces (e.g., $U_{3a}$ and $U_{3c}$) of the bottom rotor disc portion 318RB are staggered rotationally (in the direction of rotation angle theta) relative to the inverted U-shaped magnetic yoke pieces (e.g., $U_{3b}$) of the top rotor disc portion 318RT and that staggered disposition is maintained as the centrally hollow rotor shaft (not shown) rotates the top and bottom rotor disc portions, 318RT and 318RB, one or more serpentine (S-like) magnetic flux conducting paths are repeatedly formed and broken due to counter-rotation of the middle housing portion 318HM relative to the top and bottom rotor disc portions.

As a consequence of this configuration (the serpentine path(s) forming configuration), a serpentine shaped magnetic flux (e.g., including segments F3a-F3b-F3c) flows through the U-shaped and straight yoke pieces and passes serially through a plurality of simultaneously widenable gap zones where the pole ends of the U-shaped magnetic yoke pieces (e.g., $U_{3a}$ and $U_{3b}$) face off with the pole ends of the straight stem, magnetic yoke pieces (e.g., Y0, Y1, . . . , Y4). In one embodiment, the simultaneously widenable gap zones are each temporarily closed (minimized) by a respective, magnetic breaker roller (e.g., only two shown: B30 and B31) at the same time that the respective pole ends of the U-shaped magnetic yoke pieces (e.g., $U_{3a}$ and $U_{3b}$) come into aligned face off with the pole ends of the straight stem, magnetic yoke pieces (e.g., Y0, Y1, . . . , Y4). The gap-minimizing actions of the respective magnetic breaker rollers (e.g., B30 and B31) are undone as the top and bottom rotor disc portions, 318RT and 318RB continue to rotate and shift their U-shaped magnetic yoke pieces (e.g., $U_{3a}$, $U_{3b}$ and $U_{3c}$) out of aligned face off with the straight stem, magnetic yoke pieces (e.g., Y0, Y1, . . . , Y4).

While not shown in the schematic of FIG. 3C, the magnetic breaker rollers (e.g., B30 and B31) as well as the U-shaped and straight stem, magnetic yoke pieces may be formed of laminated strips according to what is shown in figures Prov-Fig. P5A-5B and/or ProvFig. P4A-P4E of here incorporated U.S. Provisional Ser. No. 61/462,134 where V-shaped grooves are formed along yoke piece edges where leakage of magnetic flux is to be minimized so that the flux field predominantly keeps its serpentine shape (and does not find alternative short circuit paths of low reluctance flow) when the one or more serpentine (S-like) magnetic flux conducting paths of FIG. 3C are formed. As is also explained in the here incorporated U.S. Provisional Ser. No. 61/462,134, when the serially arranged gaps of the serpentine (S-like) magnetic flux conducting paths simultaneously widen, the magnetic flux field collapses rapidly and therefore, even if the rotor-to-stator relative RPM is low, a relatively large EMF is induced in surrounding electrical coils such as Coil(00) of here discussed FIG. 3C. The rate of effective gap widening is basically a function of the sum of the individual gap widening rates of the serially arranged gaps and thus extremely large rotational speeds (high RPMs) are not needed of the relatively stationary (e.g., slower turning) middle housing portion 318HM and of the counter-to-it and faster rotating top and bottom rotor disc portions, 318RT and 318RB in order to produce practical magnitudes of voltage for powering transport devices and the like. The serpentine (S-like) magnetic flux using generator disclosed here is not limited in use to transport applications. It may be used (alone or in combination with mechanical motion amplification and/or rectification) in a variety of applications where it is beneficial to convert relatively low rates of rotation (low RPM) or of reciprocation into electrical energy, such as for example within windmills having slow rotating blades and/or wind-sail applications having slow reciprocating sail structures and/or water wave applications having slow reciprocating, wave catching structures.

In one embodiment (not fully shown), there is no top rotor disc portion, 318RT and instead its U-shaped yokes (e.g., U3b) are fixedly attached as continuations of the straight yokes (e.g., Y1) while only the bottom rotor disc portion, 318RB is present and rotates. As a result, both of O-ring shaped magnetic conduction paths and serpentine paths are alternately formed. The gap widening rates of the serpentine paths will of course be reduced in this alternate embodiment (not fully shown) since the upper gaps (previously mediated by breaker roller B31) will not be present. On the other hand, an advantage of this alternate embodiment is that the magnetic attraction between the bottom rotor disc portion, 318RB and the stator can function as a form of friction-reducing load bearing in that it pulls the mass of the rotor upwardly against the force of gravity if oriented as shown.

Figure 3D:
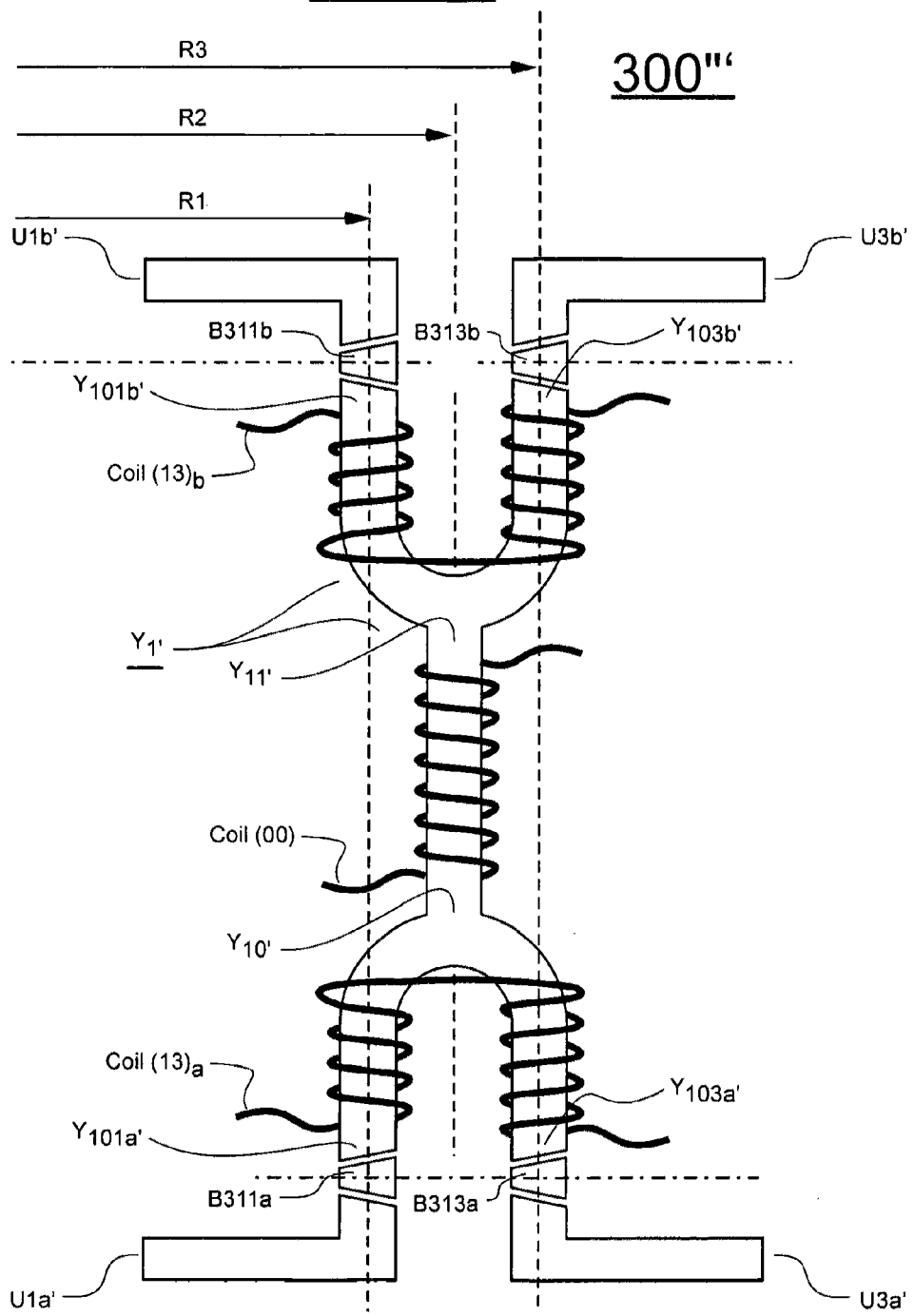
FIG. 3D is a schematic side cross sectional view of both of the generator and motoring mode portions of an embodiment similar to that of FIG. 3C.

Referring to FIG. 3D, shown in cross sectional profile is another embodiment 300''' similar to that of FIG. 3C except that in FIG. 3D, each of the straight stem, magnetic yoke pieces (e.g., Y0, Y1, . . . , Y4) is replaced by a so-called, Y-doubled-ended magnetic yoke piece (only one, Y1' shown). The Y-doubled-ended magnetic yoke piece Y1' has a straight stem portion disposed at radius R2 and two U-shaped end portions with respective pole ends Y101a', Y103a' and Y101b', Y103b'; wherein the "a" ends are on the bottom and the "b" ends are on top. Also, the "Ynn1" ends are disposed at radius R1 and the "Ynn3" ends are disposed at radius R3, where R3>R2>R1 and "nn" here refers to the "10" prefix in the Y reference numbers.

A center coil, Coil(00) wraps around the middle step section of the Y-doubled-ended magnetic yoke piece Y1' while respective end coils, Coil(13)a and Coil(13)b both respectively wrap around the bottom and top U-shaped end portions. The end coils, Coil(13)a and Coil(13)b are each wound opposingly around their respective radius R1 and radius R3 stems such that, for a given excitation current flowing through the center coil, Coil(00), only one of the radius R1 and radius R3 stems at each U-shaped end portion is excited for flux flow in the same direction while the other is excited by its end coil for flux flow in an opposed direction.

Thus, in one instance, magnetic flux may be directed to flow from a pole end of a first U-shaped (and bent) yoke piece U1a', through first magnetic breaker roller B311a, then into a corresponding first end pole Y101a' of the Y-doubled-ended magnetic yoke piece Y1', up through the R2 placed center stem (from region Y10' to region Y11'), then out through a second end pole Y101b' of the Y-doubled-ended magnetic yoke piece to continue through a corresponding second magnetic breaker roller B311b and into a pole end of a second U-shaped (and bent) yoke piece U1b', where in this case each of the first and second U-shaped (and bent) yoke pieces, U1a' and U1b' has its respective pole ends (only one shown for each) at the R1 radius of its respective rotor disc (not shown, see instead 318RT and 318RB of FIG. 3C).

In a second instance, magnetic flux may be directed to flow from a pole end of a third U-shaped (and bent) yoke piece U3a', through third magnetic breaker roller B313a, then into a corresponding third end pole Y103a' of the Y-doubled-ended magnetic yoke piece Y1', up through the R2 placed center stem (from region Y10' to region Y11'), then out through a fourth end pole Y103b' of the Y-doubled-ended magnetic yoke piece to continue through a corresponding fourth magnetic breaker roller B313b and into a pole end of a fourth U-shaped (and bent) yoke piece U3b', where in this case each of the third and fourth U-shaped (and bent) yoke pieces, U3a' and U3b' has its respective pole ends (only one shown for each) at the R3 radius of its respective rotor disc.

Referring back to FIG. 3C for sake of having a 3-dimensional perspective, it may be appreciated that, because of a staggered angular orientation of the U-shaped (and not bent) yoke pieces of the top rotor disc 318RT versus those (e.g., U3a, U3c, etc.) of the bottom rotor disc 318RB, serpentine flux conveying paths are formed by the ferromagnetic materials of the U-shaped and straight stem yoke pieces of FIG. 3C. However, if one of the upper or lower rotor discs, 318RT and 318RB were re-orientated into a non-staggered configuration with the other, O-ring shaped flux conveying paths would be formed by the ferromagnetic materials of the U-shaped and straight stem yoke pieces of FIG. 3C.

In the case of FIG. 3D, both configurations are present. The third and fourth U-shaped (and bent) yoke pieces, U3a' and U3b' which have pole ends at the larger radius, R3 are staggered relative to one another so as to define serpentine flux conveying paths in combination with the Y-doubled-ended magnetic yoke pieces (only one, Y1' shown). The first and second U-shaped (and bent) yoke pieces, U1a' and U1b' which have pole ends at radius R1 are not staggered relative to one another and thus define, in combination with the Y-doubled-ended magnetic yoke pieces (only one, Y1' shown), O-ring shaped flux conveying paths.

Although the radius R1 and R3 pole ends of the Y-doubled-ended magnetic yoke piece Y1' are radially in line with one another, this is not true of the respective pole ends of the radius R1 and R3 U-shaped (and bent) yoke pieces or of the radius R1 and R3 disposed magnetic breaker rollers. More specifically, and for purpose of example, pole ends Y101b' and Y1043' lie along a same radially extending line of the upper rotor disc (see 318RT of 3C). However, magnetic breaker rollers B311b and B313b do not lie along a same radially extending line, they are angularly staggered relative to one another. Thus the radius R1 and O-shaped flux conveying circuits are not closed at the same time that the serpentine flux conveying circuits of radius R3 are shifted into minimized gaps state. The angle of the rotor versus stator is different when the closed O-shaped flux conveying circuits are formed as compared to when the closed serpentine flux conveying circuits of radius R3 are formed. Additionally, the radius R1 magnetic breaker rollers, B311a and B311b of one embodiment are substantially homogeneously filled in their breaker portions with ferromagnetic material while the radius R3 magnetic breaker rollers, B313a and B313b are only partly filled in their breaker portions with ferromagnetic material (e.g., in an I-bar configuration or an X-bar configuration) so that, in the latter case, a formed serpentine flux flow collapses rapidly once the optimum angle of rotation is passed while in the former case (the radius R1 magnetic rollers), a formed O-ring flux flow reaches maximum more slowly as the optimum angle of rotation is approached. The latter is better for motoring modes that benefit from high and long lasting torque.

As should be apparent by now, the serpentine flux conveying circuits that have widenable gaps at the radius R3 cylindrical shell are preferably used during generator mode while the O-shaped flux conveying circuits that have close-able gaps at the radius R1 cylindrical shell are preferably used during motoring mode. The reason for placing the generator mode gaps at the greater R3 radius is because higher circumferential speed is desired for inducing a sizable EMF during electrical generator mode. On the other hand, during motoring mode, it is desirable to have slower closing, but narrower magnetic gaps as the optimum angle of rotation is approached so that torque is applied for a longer duration per rotation cycle. When the O-shaped flux conveying circuits are formed and are having their gaps closing in parallel for purpose of motoring mode, the gap closing forces add up in parallel. On the other hand, when serpentine flux flow paths are formed for purpose of generator mode, the gaps widen in series and thus the rates of gap widening add up in series so as to collapse the field that much faster.

In FIGS. 3C and 3D, tapered or substantially frusto-conical magnetic breaker rollers are used as shown because circumferential speed increases as radius from the common center of rotation axis of the R1, R2 and R3 radii increases. FIG. 3D shows that the yoke ends of the Y-doubled-ended magnetic yoke piece Y1' are angled to match the tapering of the corresponding breaker rollers, B311a, B313a, B311b, B313b. Although for sake of illustrative simplicity such angling is not shown for yoke ends like Y11 and Y10 (FIG. 3C), it is to be understood that similar end pole angling is to be employed if the magnetic breaker rollers (e.g., B30, B31) are employed. Use of the magnetic breaker rollers is not required, and in the case where the tapered breaker rollers are nor present, facing pole ends of the U-shaped yokes and the straight or Y-doubled-ended magnetic yoke piece may be flat, parallel and providing air gaps there between in respective ones of FIGS. 3C and 3D. It is to be understood that the configurations shown in FIGS. 3C and 3D are non-limiting and that the principles thereof (e.g., forming serpentine flux flow loops and forming O-ring loops) may be realized in many other ways. For example, wiring coils may alternatively or additionally be formed about the U-shaped yoke pieces (e.g., U3a, U3b, U3c of FIG. 3C). As another example, coil wiring need not loop first entirely around one stem piece (e.g., Y0 of FIG. 3C) and then entirely around a next (e.g., Y1). Rather, the wiring may snake around from one stem piece to the next and the next, or form mini coils on one stem piece and then the next and the next where plural mini coils are wrapped about each stem piece but are not all necessarily excited at once.

Figure 4A:
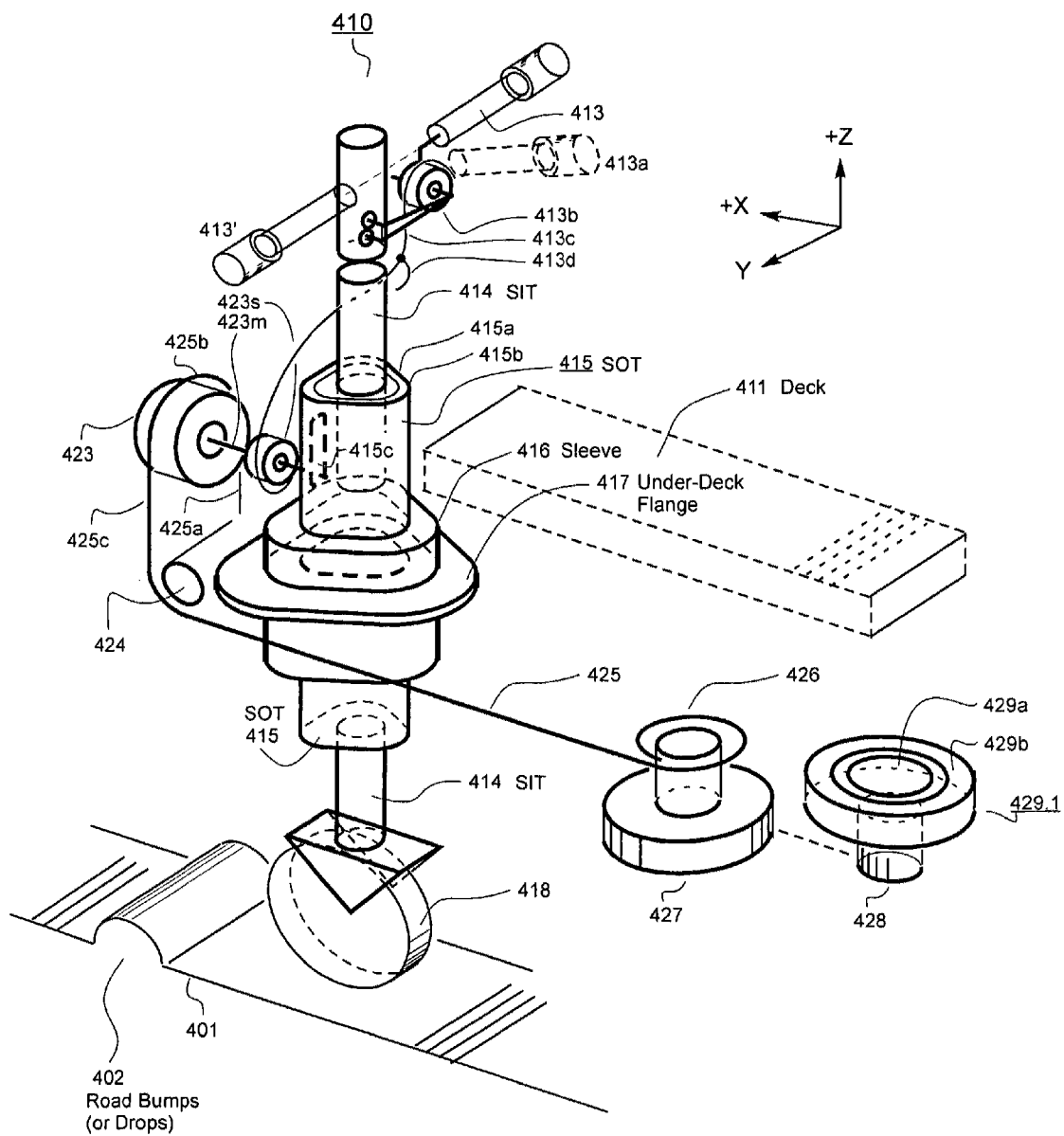
FIG. 4A is a schematic side view diagram of another transport vehicle whose reciprocatable steering-column includes a steering outer tube (SOT) and a steering inner tube (SIT)

Referring to FIG. 4A, shown is a schematic side view diagram of another transport vehicle 410 whose reciprocatable steering-column includes a steering outer tube (SOT) 415 and a steering inner tube (SIT) 414. The transport vehicle 410 is designed to ride on a roadway 401 which may have bumps 402 (or ruts/drops) over which a steerable front ground wheel 418 of the vehicle rides. For sake of initial simplicity, it may be assumed that the steering inner tube (SIT) 414 is rotated by a steering handle bar 413' fixedly fastened to the SIT 414.

Although FIG. 4A, shows the SIT 414 as connecting substantially directly to the steerable front wheel 418 for thereby providing both a steering function and a load bearing function, this does not have to be so. It is within the contemplation of the present disclosure that a steering function may be provided by either or both of a more generic steering outer tube (SOT, e.g., one that can turn and has the steering handle bar 413' instead fixedly or otherwise fastened to it rather than to the SIT) and a more generic steering inner tube (SIT) or by yet other means. Similarly, it is within the contemplation of the present disclosure that a front end load bearing function may be provided by another means (e.g., vehicle frame not shown) rather than by either of both of the steering outer tube (SOT) and steering inner tube (SIT).

In the illustrated example of FIG. 4A, the steering outer tube (SOT) 415 has a non-circular outer surface (e.g., one with a triangle-like cross sectional profile) which is configured to reciprocate vertically through a similarly shaped receiving space of an SOT-guiding sleeve 416. In an alternate embodiment, the SOT 415 may have a circular outer surface. The SIT 414 has a circular outer surface and rotates within the SOT 415 but dos not reciprocate relative to the SOT 415 (for example due to two, on-SIT retaining clips or flanges, not shown, that keep the SOT 415 fixedly positioned in the Z-direction relative to the SIT 414). Accordingly, when the steerable front wheel 418 of a forward moving vehicle hits a bump in the road, like bump 402, the SIT 414 and SOT 415 are jointly driven upwardly through and relative to the SOT-guiding sleeve 416. Although not fully shown, the SOT-guiding sleeve 416 attaches to the vehicle's pivoting deck 411 (shown in partial phantom) on which the rider normally stands. The SOT-guiding sleeve 416 has an under-deck flange 417 against whose top surface the deck 411 mounts.

As a result of inertia, when the bump 402 is encountered, the rider's mass, the deck 411, and the SOT-guiding sleeve 416 stay relatively stationary in the Z-direction while the SIT 414 and SOT 415 jointly move up relative to the deck 411 and sleeve 416. This relative translation of the SIT/SOT combination 414/415 is coupled to a pulley cable 425 where, in one embodiment, the pulley cable 425 wraps over a pulley wheel 423 that rotatably mounts on an extension shaft 423m that is fixedly (or otherwise) fastened to a front face of the SOT 415. (The "otherwise" version of shaft 423m will be described later below.) Therefore, a Z-direction translation by the SIT/SOT combination 414/415 relative to the deck 411 by a distance of $\Delta L$ converts into at least a $2*\Delta L$ translation of the pulley cable 425 due to pulley action described above. In one embodiment, a far end 425a of the cable fastens directly to the on-deck guiding sleeve 416 where the latter fastens to the deck 411. The guiding sleeve 416 may be made of a metal like aluminum while the deck 411 may be made of a wood and/or a molded plastic. A subsequent portion 425b of the cable wraps over the top of the pulley wheel 423. A next portion 425c descends to below the deck for turning by 90 degree about a guide 424 and continuing under the deck to wrap about an under-deck spool hub 426. Although not explicitly shown, it is to be understood that the under-deck spool 426 is urged by a rewind spring into a normally wound state. The bump-induced translation of the pulley cable 425 out of the spool by a length of at least a $2*\Delta L$ causes the spool 426 to unwind by a commensurate rotation amount and thereafter the spool rewinds when the tension on the cable 425 decreases after the downhill part of the bump 402 is passed over. As a result of these actions, the reciprocatable SIT/SOT combination 414/415 plus the spring tensioned pulley cable 425 function as a shock absorber that converts front end road shocks into reciprocating rotations of the under-deck spool 426. The spool 426 couples to a speed-increasing gear 427 where the latter mechanical motion amplifier (MMA) couples to an inner shaft 428 of a ratchet-action first clutch 429.1. Outer section 429b rotates in only one direction while inner section 429a rotates bidirectionally. While not shown in FIG. 4A, there can be a second ratchet-action clutch (429.2) that captures the reverse direction rotation of the spool 426. (See instead 463, 465b of FIG. 4B.) The rectified rotations of the spool 426 are next transferred, in one embodiment, to a combination gear box and motor/generator similar to the one shown in FIG. 3A. (See also 485a/485b of FIG. 4B which is described below.) In a variation of FIG. 4A, mechanism 428/429 is disposed forward of (in the +X direction) of mechanism 426/427.

As mentioned above, in one embodiment, the far end 425a of the pulley cable 425 fixedly fastens to the deck and/or the on-deck sleeve 416, where the reciprocatable SIT/SOT combination 414/415 reciprocates through the sleeve. However, in a second embodiment (not fully shown), the far end 425a of the pulley cable wraps onto a second spool (not shown) where that second spool is driven by a roller (not shown, but an independently rotatable part of cylindrical section 424 can function as such a roller) that engages one of the three flat outer surface faces of the triangle-like steering outer tube (SOT) 415. When the SIT/SOT combination 414/415 reciprocates upwardly through the sleeve 416, the second spool (not shown, but for example driven by a roller portion of cylindrical section 424) is driven to take in a respective length of the far end 425a of the pulley cable. As result, the amount of pulley cable length pulled out from (unwound from) the first spool 426 is equal to $2*\Delta L$ plus the additional length taken in by the second spool (not shown). That is why the above description of the $\Delta L$ translation provided by the SIT/SOT combination 414/415 relative to the deck 411 states that the distance of $\Delta L$ converts into "at least" a $2*\Delta L$ translation of the pulley cable 425; because the latter can be more than $2*\Delta L$ if the second driven-spool option and/or other equivalents are employed for the far end 425a of the primary pulley cable 425. In one embodiment, the far end spool option is selectably employable or not based on user choice. When the selectable far end spool option is not employed, the cable far end 425a is held stationary relative to the deck sleeve 416. Accordingly, the user may select different pulley action ratios depending on whether the far end spool option is selectably employed or not.

The driving roller (not shown) for the optional second spool (not shown) can roll against either the forward facing (in +X direction) flat outer surface face of the triangle-like steering outer tube (SOT) 415 or against one of the side flat outer surface faces (e.g., 415a). The axis of rotation of this driving roller (not shown) connects to the sleeve 416 so that roller is driven as the SIT/SOT combination 414/415 reciprocates relative to the deck 411 and sleeve 416. In one embodiment, two pinch rollers (not shown) respectively engage against the two side flat outer surface faces (e.g., 415a) of the SOT 415. The shafts of these two pinch rollers (not shown) extend forward of the SOT 415 at a diverging angle. As a result one or two relatively large diameter spools or drive gears can be respectively attached to these outwardly diverging shafts (not shown). The motion of these large diameter spools or drive gears (not shown) can then be coupled to under the deck for driving the first spool 426 and/or another driven means.

A first embodiment (as described above) has the pulley wheel shaft 423m fixedly fastened to the front flat face of SOT 415. In an alternate embodiment, however, the pulley wheel shaft 423m is mounted for (and may have braces, not shown, for reinforcing the function for) having an end thereof reciprocate in a vertical guide slot 415c formed in the front flat face of SOT 415. When the SIT/SOT combination 414/415 reciprocates upwardly relative to the deck 411 and sleeve 416, the bottom end of the vertical guide slot 415c forces the pulley wheel shaft 423m upwardly as before, thereby displacing at least a $2*\Delta L$ length of the pulley cable 425. When the SIT/SOT combination 414/415 reciprocates upwardly relative to the deck 411 and sleeve 416, tension provided by the rewind spring (not shown) of spool 426 pulls the pulley wheel shaft 423m and its supported pulley wheel 423 downwardly so as thereby to allow the rewinding spool 426 to uptake at least a $2*\Delta L$ length of the pulley cable 425 that was earlier unwound from it. Accordingly, rotational reciprocations of the unwindable spool 426 (and MMA gear 427) proceeds substantially as described above in response to vertical reciprocations of the SIT/SOT combination 414/415.

Additionally, a second pulley wheel 423s is rotatably mounted on the pulley wheel shaft 423m and has a respective second pulley cable 413c wrapped under that second pulley wheel 423s. A shortening of the second pulley cable 413c in the upward direction urges the pulley wheel shaft 423m up along the vertical guide slot 415c and thus drives the first pulley wheel 423 (as well as second wheel 423s) up by a same vertical distance (e.g., ΔL'). This then translates into an increase by at least a 2*ΔL' length of the pullout of the first pulley cable 425 and a corresponding unwinding of the underbelly spool 426.

Any one or more mechanisms can cause a shortening of the second pulley cable 413c in the upward direction. By way of example, the second pulley cable 413c is shown in FIG. 4A to wrap onto a rotatable drum 413b that can be rotated by a down-arching motion of the right side steering handle bar 413. When the rider (not shown) forces handle bar 413 down into phantom position 413a, the bar-driven drum 413b rotates and takes up a length of the second pulley cable 413c, thereby shortening the length extending to pulley wheel shaft 423m and driving the latter shaft 423m upwardly. The handle bar-driven drum 413b rotates on a right-angle bent shaft that connects to the SIT 414. This allows the downwardly arc-able steering handle bar 413 to provide a steering function even as it also provides a pumping action to the underbelly spool 426 by way of lifting the first and second pulley wheels, 423 and 423s, this lengthening the unwound part of first cable 425. Although not fully shown, it is to be understood that in this alternate embodiment, the fixed steering handle bar 413' is replaced by a mirror image version of the downwardly arc-able steering handle bar 413 and its drum 413b while the second cable 413c wraps from under the second pulley wheel 423s to connect to the mirror image second bar-driven drum (not shown). As a result of this latter arrangement, a downward pumping of either or both of the downwardly arc-able steering handle bars (only one shown at 413) shortens the second pulley cable 413c and drives the shaft 423m and its supported first pulley wheel 423 upwardly. The first pulley wheel 423 (and its shaft 423m) are urged back down by the tension provided by the rewind spring (not shown) of spool 426. Therefore a user of the illustrated vehicle driving mechanism can supply manual pumping power by using his/her feet to pump deck 411 up and down and/or by using his/her hands to pump one or both of the downwardly arc-able steering handle bars (only one shown at 413) down and then let them automatically spring back up. In a further variation (not shown), selectable mechanical motion amplification and/or reduction means (MMA/MMR, a.k.a. selectable gearings) are interposed between the downwardly arc-able steering handle bars (only one shown at 413) so that the user can selectably vary the amount of back tension exerted to his/her muscles with each down stroke. The selectable mechanical motion amplification and/or reduction ratios (a.k.a. gearing ratios) need not be the same for the left and right handle bars and hence the user can exercise different muscles at different settings as desired.

While not fully shown in FIG. 4A, a yet further attachment 413d may be provided further down along cable 413c or connected to shaft 423m for tugging on that second pulley cable 413c with a back-pulling hand action of the user or tugging upwardly on shaft 423m so as to provide the user with a variety of different exercising motions, all of which pump manual power into the energy capturing and storing subsystem of the vehicle 410. And accordingly, when the rider is waiting at a red light or traffic stop sign, the rider may use different ones of his/her muscle groups to keep pumping power into the energy capturing and storing subsystem (e.g., primary M/G 318 of FIG. 3A) as the rider waits for his/her turn to cross the intersection. The downwardly arc-able steering handle bars (only one shown at 413) may be additionally folded down when the vehicle is folded for storage. In the latter case, the rewind spring (not shown) of the spool 416 is released to ease the folding operation. (The further attachment 413d—which could be a cable connected more directly to shaft 423m—may additionally be pumped (pulled and released) by a wind-driven or otherwise driven tow rope or the like, for example when the vehicle 410 is parked at a parking stand or being towed by a towing service. Hence energy can be pumped into the vehicle's energy storage systems even while the user is not manually providing the energy).

Although the limited vertical reciprocation of the multi-pulleys shaft 423m is shown in FIG. 4A to be provided by the illustrated vertical guide slot 415c, in an alternate embodiment, the shaft (423m) is attached to a second vertically reciprocatable and triangle-like sleeve (not shown) that fits over the upper portion of SOT 415 and is given a limited range of vertical reciprocation similar to that of the illustrated vertical guide slot 415c. The second sleeve (not shown) may have roller bearings interposed between its inner surfaces and the outer flat surfaces of the SOT 415.

Accordingly, it may be seen that aside from the roller engaging options that can be provided by the three substantially flat side outer surface faces (e.g., 415a, which flats can have horizontal or angled gear grooves formed in them) of the triangle-like SOT 415; the three substantially flat faces (e.g., 415a) can engage with optional roller bearings inserted between the three substantially flat SOT face portions (e.g., 415a) and corresponding, and also substantially flat, inner faces of SOT-receiving spaces formed in the second sleeve (discussed above) and also of the on-deck first sleeve 416. Since the V-shaped cross sectional profile of the SOT side face portions (e.g., 415a) can self center relative to the V-shaped cross sectional profile of the optional roller bearings (not shown), the SOT-receiving space(s) formed in the on-deck sleeve 416 and/or in the second sleeve do not have to be machined to extreme precision. During use, the top back part of the SOT 415 will generally press against the back top part of the SOT-receiving space and the bottom front part of the SOT 415 will generally press against the bottom front part of the SOT-receiving space. When increased tension is applied to pulley cable portions 425a and 425c (due for example, to down pumping by the rider against the deck 411) they will tend to urge the SOT 415 to disengage from its tilted pressings against the back top part of the SOT-receiving space thus freeing the SOT 415 for reciprocation within the on-deck sleeve 416.

Figure 4B:
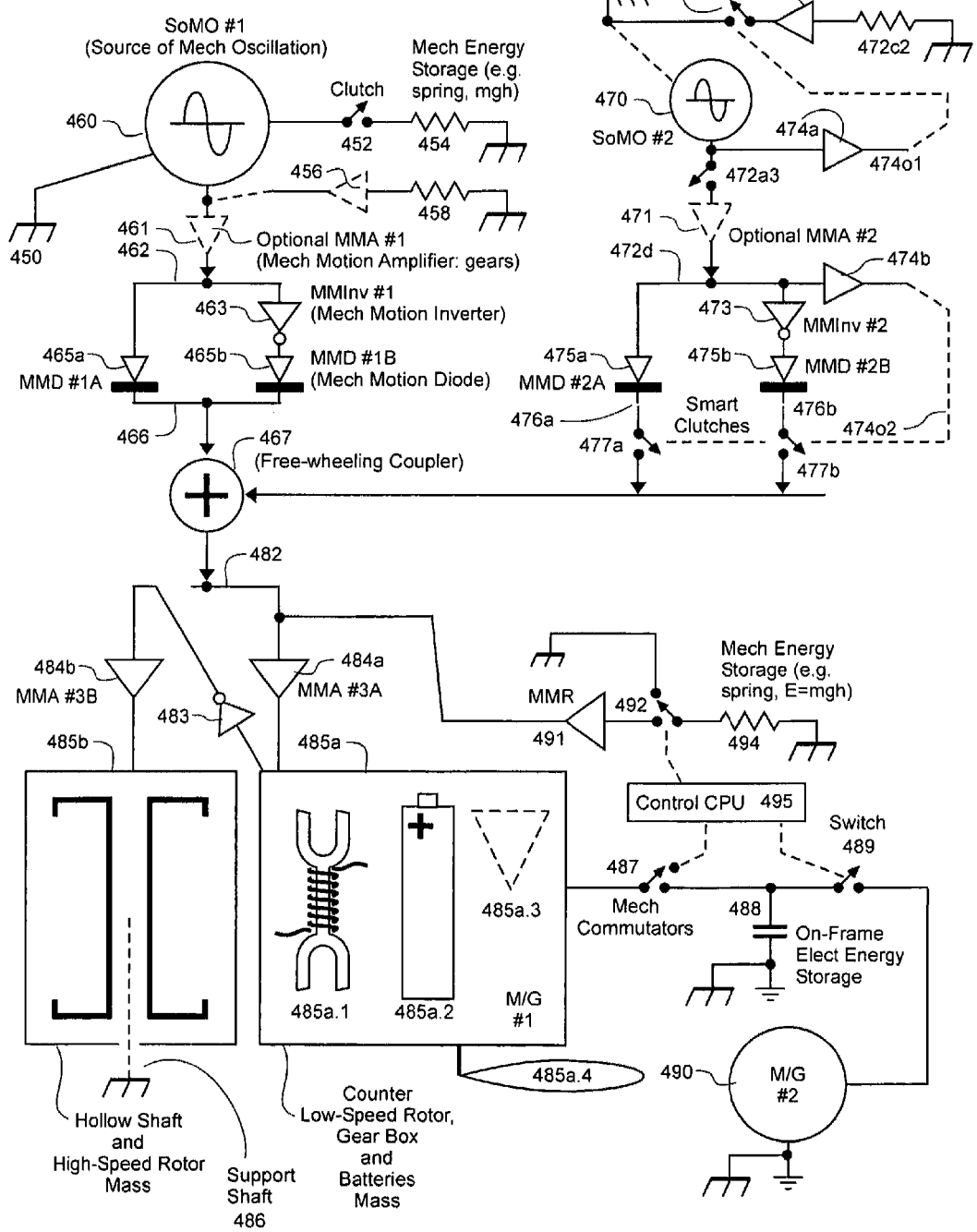
FIG. 4B is a schematic power flow diagram for a number of variations in accordance with the present disclosure.

Referring next to FIG. 4B, many variations on theme may be devised beyond those mentioned for FIG. 4A. Rather than attempting to show them all, a schematic representation of the basic concepts is shown in a power flow diagram 450 provided by FIG. 4B. A first source of mechanical reciprocating power or oscillation (SoMo#1) is schematically shown at 460 using a symbol similar to that for a source of AC electrical power (except this one represents bidirectionally moving mechanical power). The first Source of Mechanical oscillation (SoMo) 460 can include manual power provided by a user of a transport device where the vehicle has a reference frame 450 of one form or another and where the user (not shown) applies one or more manual forces over respective distances and in respective directions relative to the frame 450. The first SoMo 460 can also include non-manual power provided by any appropriate source of mechanical reciprocation such as the piston of a reciprocatable heat engine for example or the oscillations of a spring-urged (spring-returned) wind sail.

Part or substantially all of the power of an output stroke of the first SoMo 460 can be temporarily stored in a first energy storage means 454 such as, but not limited to, a spring means, a temporarily lifted weight (whose potential energy is then expressible as E=mgh, where m is the lifted mass and h is the effective height of lift), a flywheel or other form of kinetic energy storage and so on. A selectively actuatable clutch 452 may be interposed between the first SoMo 460 and the first energy storage means 454 such that the timings of energy flow to and from the first energy storage means 454 can be controlled. In one embodiment, the potential energy (E=mgh) stored by storage means 454 can include a lifted portion of the vehicle and/or of a vehicle user. A further description of timed energy storage and timed release will be provided when switch 492 is detailed below. The switchable versions shown at 452/454 and 456/458 can respectively function to provide respective and oscillatory mass-spring subsystems.

In one embodiment, a mechanical motion reducer 456 is optionally interposed between a reciprocating part of SoMo#1 (460) and a spring means 458 that couples at another end thereof to the frame 450. The Mechanical Motion Reducer or MMR 456 can be in the form of pivoted lever arms that exhibit a mechanical motion reducing factor as between input (from 460) and output (to a reciprocatable end of spring means 458) or a speed reducing gear train or other such mechanical motion reducing means (e.g., hydraulic means). The spring means 458 can be in the form of a resilient element such as a resilient metal spring (e.g., linear or spiral) or a gas compressing piston or other such mechanical spring action means. Because the MMR 456 functions to mechanically expand or increase displacement motions of the spring means 458, the reciprocatable displacement range of the spring means 458 can be made smaller than that of the corresponding reciprocating part of SoMo#1 (460).

A reciprocating output part of SoMo#1 (460) may couple by way of an optional Mechanical Motion Amplifier (MMA#1) 461 or directly to a rectification input part 462. The mechanical motion amplifier 461 can be in the form of pivoted lever arms that exhibit a mechanical motion increasing factor as between input (from 460) and output (to part 462) or a speed increasing gear train or other such mechanical motion amplifying means (e.g., hydraulic means).

The rectification input part 462 is configured to reciprocate and to couple to a pair of mechanical motion diodes (e.g., ratchets, one-way clutches) 465a, 465b, one of which has a mechanical motion reverser (inverter) 463 disposed before it. The outputs of the first and second mechanical motion diodes, MMD#1A (465a) and MMD#1B (465b) connect to a one-way moving (e.g., rotating) part 466. Both mechanical motion diodes, 465a, 465b, are oriented to drive the one-way output part 466 in a same pre-specified direction. When the rectification input part 462 is moving in a direction consonant with the one-way output direction (of part 466) and its effective speed exceeds that of the one-way output part 466, the first mechanical diode 465a couples mechanical motion power to the output part 466. On the other hand, when the rectification input part 462 is moving in a direction opposite to that of the one-way output direction (of part 466) and its effective speed exceeds that of the one-way output part 466, the serial combination of the motion reverser (inverter) 463 and the second mechanical diode 465b couples mechanical motion power to the output part 466.

The one-way moving (e.g., rotating) power of the rectification output part 466 may couple through a free moving (free wheeling summation coupler, optional) to a primary motor/generator (M/G#1) having a mechanical motion inputting part 482. The one way rotational power of inputting part 482 operatively couples to two in-series, mechanical motion amplifiers 484a, 484b (a.k.a. MMA#3A, MMA#3B), with a direction inverter 483 (MMInv#3) being serially interposed between the two. MMA#3B (the amplifier driving the faster rotor part 485b) has a greater output mechanical motion amplification factor than that of the serially preceding MMA#3A (the amplifier driving the slower rotating "stator" 485a). In one embodiment, a further inverter (not shown) is switchably moved into and out of the connection between elements 467 and 482. The reason is so that the generator's parts are periodically rotated in reverse direction rather than being biased to wear out in one direction only. However, this is optional.

A mechanical energy storage means 494 may be optionally coupled to the slower rotating "stator" 485a, for example by way of a selectively actuatable clutch 492 and an optional mechanical motion reducer 491 (MMR). In one variation, mechanical energy storage means 494 is a suspension spring on which the vehicle weight rests and that spring may be temporarily locked into its abnormal, energy storing state and then later released at a desired time through for example a mechanical motion rectifier (not shown, but like and coupled in same way as is 463, 465a/465b). The temporary mechanical energy storage means 494 may be, or include, any of a variety of other ways for storing potential energy, such as by temporarily lifting the weight (E=mgh) of the vehicle and rider or part of that weight. An energy-storing state may be temporarily preserved by switching clutch 492 temporarily into a coupling with the frame rather than with MMR 491.

The mass of the slower rotating "stator" 485a may include one or more of: (a) the housing of, and at least part of the mechanical motion amplifying gearings 485a.3 that drives the hollow shafted rotor 485b faster and in the opposite rotational direction (where a portion of inverter 483 can be part of the mass of 485a.3); (b) at least some of the electrical batteries 485a.2 that may be charged by electrical energy generated in generator mode by the primary motor/generator (M/G#1); (c) the stator magnetic yoke pieces 485a.1 which magnetically couple to the oppositely rotating rotor 485b and electronic modules that intelligently drive the coils of those yoke pieces 485a.1; (d) air fanning blades 485.4 which pump cooling air flow over parts of the primary motor/generator (M/G#1) and its attached parts which may need such cooling (e.g., the rechargeable batteries 485a.2). In one embodiment, blades 485a.4 are selectively retractable.

A support shaft 486 that attaches to the vehicle frame rotatably supports the hollow shafted fast rotor 485b as well as also rotatably supporting the counter-spinning and slower "stator" 485a. Although not shown in the schematic of FIG. 4B, it is to be understood that mechanical motion amplifiers 484a, 484b as well as inverter 483 have parts that rotate relative to the frame shaft 486.

A set of mechanically moving commutators 487 couple electrical energy and/or control signals between the slow rotating stator 485a and one or more, on-the-frame electrical energy storing means (e.g., more rechargeable batteries) 488. Commutated ones of control and sensory signals couple to an on-frame data processing unit (e.g., CPU) 495 where the latter may control various actuations within the vehicle, including for example, operation of electrical switch 489 and operation of the secondary motor/generator 490. The secondary motor/generator 490 may drive a vehicle propelling wheel (not shown) as well as returning regenerative braking power for storage as kinetic energy in the primary motor/generator 485a/485b.

Any number of additional reciprocatable power supplying means such as 470 may additionally contribute their reciprocating powers to receiving node 467. The illustrated additional SoMO#2 (470) couples to one or more temporary energy storage means such as springs 472c1 and 472c2. SPDT switch symbols 472a1 and 472a2 represent electronically controlled mechanical clutches that freeze their respective springs 472c1 and 472c2 in respective energy storing states when switched to couple the respective spring ends to the frame and that couple their respective springs 472c1 and 472c2 to source 470 (and/or to clutch 472a3) via respective MMA's 472b1 and 472b2 when switched the other way. Each of clutches 472a1 and 472a2 is independently controlled by a respective control signal (collectively shown as 474o1) provided by a computer controller (not explicitly shown but formed at an output and transduced end of MMA 474a). Clutch 472a3 may be similarly computer controlled. The computer controller (474a) senses the output state of additional SoMO#2 (470) and responsively determines whether to couple or not one or more of the temporary energy storage means (e.g., springs 472c1 and 472c2, but could also be or include lifted weight means) to the additional SoMO#2 (470) for the purpose of either capturing and storing some of its energy or additively contributing to its output. For example, before a surge of acceleration power is called for, spare energy is stored one at a time in the one or more (could be 3, 4, etc. of them) of the temporary energy storage means (e.g., springs 472c1 and 472c2). Then, when the surge is determined by the computer controller (474a) to be needed, all of smartly controlled clutches 472a1, 472a2, etc. are simultaneously switched to couple their stored energies to add to that of SoMO#2 (470) or alternatively to feed directly into MMA 471.

Clutch 472a3 is optional and is also a smartly controlled clutch that responds to control decisions made by computer controller (474a). Clutch 472a3 may be kept open while spare energy is stored for example, one at a time in the one or more (could be 3, 4, etc. of them) of the temporary energy storage means (e.g., springs 472c1 and 472c2). Clutch 472a3 is automatically closed when the SoMO#2 (470) and/or the temporary energy storage means (e.g., springs 472c1 and 472c2) are outputting power to reciprocatable part 472d (via optional MMA 471).

One version of the additional reciprocatable power supplying means includes so-called, Smart Mechanical Motion Rectifying means (SMMR) 472d-477a,b wherein a second mechanical motion amplifier plus electronic controller 474b are used to develop an amplified motion control signal 474o2 that is based on whether the speed of one-way rotating part 476 is above, or not, the speed of one-way rotating part 482. If it is not above the speed of one-way rotating part 482, then one-way rotating part 476 is determined as not being able to contribute additional power to one-way rotating part 482 and smart clutches 477a,b are automatically opened up so that the mechanical motion rectifiers 475a/475b will not add drag to the movement of one-way rotating part 482. On the other hand, when the amplified motion signal 474o indicates that the speed of one-way rotating parts 476a, 476b are respectively above or below that of part 482, then the respective smart clutches 477a or 477b are automatically closed at their respective positive-contribution times so that respective one-way rotating parts 476a, 476b contribute additional power to part 482 at the time of clutch closing but do not drag on part 482 when their speeds drop below that of part 482.

While numerous embodiments have been disclosed directly herein and/or indirectly by the here-incorporated by reference U.S. Provisional Ser. No. 61/462,134, it is to be understood that these embodiments are illustrative and not intended to be limiting.

In other words, the totality of the present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

RESERVATION OF EXTRA-PATENT RIGHTS, RESOLUTION OF CONFLICTS, AND INTERPRETATION OF TERMS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the here disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A transport vehicle adapted to transport a rider and having a weight supporting wheel, the weight supporting wheel being disposed to support at least part of and during at least part of the time, a summed weight of the rider and of the vehicle, the transport vehicle further comprising:

(a) a rider support adapted to support at least part of the weight of the rider, the rider support being displaceable relative to the weight supporting wheel and/or the weight supporting wheel being displaceable relative to the rider support; and (b) an electric generator operatively coupled to be driven by at least one of a displacement of the weight supporting wheel relative to the rider support and a displacement of the rider support relative to the weight supporting wheel;

wherein the electric generator includes a series of simultaneously openable and/or widenable magnetic gaps through which a serially conducted magnetic flux can flow where a simultaneous opening and/or widening of the series of simultaneously openable and/or widenable magnetic gaps decreases an intensity of the serially conducted magnetic flux at a rate corresponding to a summation of the opening and/or widening rates of the simultaneously openable and/or widenable magnetic gaps.

2. The transport vehicle of claim 1 wherein:

the rider support defines a multi-directionally movable first member that is movable in a first direction by a corresponding first directed driving force applied thereto and is movable in an opposed second direction by a corresponding second directed driving force applied thereto, the second direction being substantially opposite to the first direction;

the electric generator includes a movable second member that is rotatable in a predetermined first rotational direction; and the transport vehicle further comprises a mechanical diode-action type and/or smart switching type coupling system operatively intercoupled between the movable first and second members and configured to substantially couple the first directed driving force applied to the first member as corresponding first rotary force applied to the second member in correspondence with the predetermined first rotational direction and to substantially not couple the second directed driving force as a corresponding second rotary force applied to the second movable member in correspondence with a second rotational direction that is opposite to the predetermined first rotational direction; and the transport vehicle also comprises an energy storing mechanism operatively coupled to the second member so as to receive therefrom energy arising from the first directed rotary force being applied over distance to the second member, the energy storing mechanism including at least a first flywheel mass configured to kinetically store at least part of a received-as-first-flywheel stored kinetic energy and to function as part of the electrical generator, the energy storing mechanism being structured to accumulatively store at least part of the received energy or the first flywheel stored kinetic energy as one or more of electrical energy, electrochemical energy or other potential energy.

3. The transport vehicle of claim 2 wherein:

the mechanical diode-action type and/or smart switching type coupling system includes a ratchet-action type and/or smart switching type of coupling that defines a full wave mechanical motion rectifier.

4. The transport vehicle of claim 2 wherein the energy storing mechanism is operatively coupled within the transport vehicle such that the energy stored in the energy storing mechanism is usable to propel the transport vehicle.

5. The transport vehicle of claim 4 wherein:

the energy storing mechanism comprises one or more flywheels coupled and structured to accumulatively store the received energy as flywheel-stored energy, where at least one of the flywheels has embedded therein at least one of a ferromagnetic member that can store magnetic field energy, a dielectric across which electrostatic energy can be stored and an electrochemical storage cell in which electrochemical energy can be stored.

6. The transport vehicle of claim 5 wherein:

the at least one of the flywheels has embedded therein the ferromagnetic member which ferromagnetic member is disposed to form part of a magnetic flux carrying loop that extends outside the at least one flywheel; and the at least one of the flywheels has embedded therein at least one of the electrochemical storage cell and the dielectric.

7. The transport vehicle of claim 2 and further including at least one of:

a first performance exhibiting mechanism that exhibits to external observers an indication of the how much of a certain kind of energy is stored in the energy storing mechanism where the certain kind of energy includes at least one of flywheel-stored kinetic energy, magnetic field energy, electrostatic energy and electrochemical energy; and a second performance exhibiting mechanism that exhibits to external observers an indication of the how much of a certain kind of power is being currently transmitted into the energy storing mechanism where the certain kind of power includes at least one of kinetic power, magnetic power and electrical power.

8. The transport vehicle of claim 2 wherein:

the energy storing mechanism includes a first rotatable member having a corresponding first rotatable mass where that first rotatable mass is defined by at least one of embedded first submembers of the first rotatable member, the embedded first submembers being selectable from the group consisting of: an electric charge storing device; a magnetic flux conducting device; a rechargeable electric battery; an electromagnet; the first rotatable member further having a plurality of electrical contacts through which electrical energy and/or control signals can be transmitted even when the first rotatable member rotates relative to a relatively stationary frame member with which the plurality of electrical contacts electrically communicate; and the first rotatable member further having electronic circuitry operatively coupled to at least one of the electrical contacts, electromagnet and electric charge storing device.

9. The transport vehicle of claim 8 wherein:

the energy storing mechanism includes a second rotatable member having a corresponding second rotatable mass where that second rotatable mass is defined by at least one of embedded second submembers of the second rotatable member, the embedded second submembers being selectable from the group consisting of: an electric charge storing device; a magnetic flux conducting device; a rechargeable electric battery; an electromagnet; the second rotatable member further having a plurality of second electrical contacts through which electrical energy and/or control signals can be transmitted even when the second rotatable member rotates relative to the relatively stationary frame member; and the second rotatable member further having electronic circuitry operatively coupled to at least one of the second electrical contacts, electromagnet and electric charge storing device of the second rotatable member;

wherein, when the first rotatable member rotates in a corresponding first member rotary direction, the second rotatable member is configured to rotate in a corresponding second member rotary direction which is opposite to the first member rotary direction.

10. The transport vehicle of claim 9 wherein:
the respective embedded first and second submembers of the first and second rotatable members can cooperate through an interface between opposingly rotating surfaces of the first and second rotatable members to thereby define said electrical generator as having an EMF produced in response to an effective rotary speed as between the opposingly rotating surfaces of the first and second rotatable members.

11. The transport vehicle of claim 10 wherein:
the respective embedded first and second submembers of the first and second rotatable members can cooperate through the interface between opposingly rotating surfaces of the first and second rotatable members to thereby define an electrical motor that generates a torque which drives the first and second rotatable members in their respective and opposed first and second member rotary directions.

12. The transport vehicle of claim 8 wherein:
the respective embedded first submembers of the first rotatable member can cooperate through an interface between a rotating surface of the first rotatable member and a stationary surface of a relatively stationary frame member of the transport vehicle to thereby define at least one of said electrical generator as having an EMF produced in response to an effective rotary speed as between the rotating surface of the first rotatable member and the stationary frame surface, and an electrical motor that generates a torque which drives the first rotatable member in its respective first member rotary direction relative to the stationary frame surface.

13. The transport vehicle of claim 12 wherein:
the interface includes a plurality of tapered roller bearings that repeatedly make substantially gapless magnetic coupling contacts as between the rotating surface of the first rotatable member and the stationary frame surface, the tapered roller bearings including a ferromagnetic material.

14. The transport vehicle of claim 12 wherein:
the interface includes a plurality of tapered roller bearings that repeatedly make substantially gapless magnetic coupling contacts as between the opposingly rotating surfaces of the first and second rotatable members, the tapered roller bearings including a ferromagnetic material.

15. The transport vehicle of claim 1 wherein the electric generator has mass and is mechanically coupled to the rider support such that displacement of the rider support results in a corresponding displacement of mass that is mechanically coupled to the rider support including displacement of at least part of the mass of the electric generator.

16. The transport vehicle of claim 15 and further comprising a first spring wherein the rider support is mechanically coupled to the first spring so as to define a mass spring system that can oscillate.

17. The transport vehicle of claim 1 and further comprising one or more electric energy storage members to which the electric generator is electrically coupled.

18. The transport vehicle of claim 17 wherein:
the electric generator is additionally mechanically coupled to at least one of the electric energy storage members;
the electric generator has mass and is mechanically coupled to the rider support such that displacement of the rider support results in a corresponding displacement of mass that is mechanically coupled to the rider support including displacement of at least part of the mass of the electric generator and the at least one of the electric energy storage members that is mechanically coupled to the electric generator.

19. A method of operating a transport vehicle adapted to transport a rider and having a weight supporting wheel, the weight supporting wheel being disposed to support at least part of and during at least part of the time, a summed weight of the rider and of the vehicle, where the transport vehicle further includes:
(a) a rider support adapted to support at least part of the weight of the rider, the rider support being displaceable relative to the weight supporting wheel and/or the weight supporting wheel being displaceable relative to the rider support; and
(b) an electric generator operatively coupled to be driven by at least one of a displacement of the weight supporting wheel relative to the rider support and a displacement of the rider support relative to the weight supporting wheel;
wherein the electric generator includes a series of simultaneously openable and/or widenable magnetic gaps through which a serially conducted magnetic flux can flow where a simultaneous opening and/or widening of the series of simultaneously openable and/or widenable magnetic gaps decreases an intensity of the serially conducted magnetic flux at a rate corresponding to a summation of the opening and/or widening rates of the simultaneously openable and/or widenable magnetic gaps;
the method comprising:
displacing at least one of the rider support and weight supporting wheel relative to the other.

20. The method of claim 19 and further comprising:
causing the weight supporting wheel to engage with a road depression and/or a road protrusion in a manner whereby the weight supporting wheel is displaced relative to the rider support.

* * * * *